(12) United States Patent
Saitoh

(10) Patent No.: US 9,212,744 B2
(45) Date of Patent: Dec. 15, 2015

(54) COMBINATION TORSION SPRING, AND SHIFT MECHANISM PROVIDED WITH SAME

(75) Inventor: Tetsushi Saitoh, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 340 days.

(21) Appl. No.: 13/988,567

(22) PCT Filed: Nov. 21, 2011

(86) PCT No.: PCT/JP2011/006465
§ 371 (c)(1),
(2), (4) Date: May 21, 2013

(87) PCT Pub. No.: WO2012/070219
PCT Pub. Date: May 31, 2012

(65) Prior Publication Data
US 2013/0233113 A1 Sep. 12, 2013

(30) Foreign Application Priority Data

Nov. 22, 2010 (JP) ................................. 2010-260614

(51) Int. Cl.
*F16F 3/04* (2006.01)
*F16H 63/18* (2006.01)
(Continued)

(52) U.S. Cl.
CPC *F16H 63/18* (2013.01); *F16F 3/04* (2013.01); *F16H 63/14* (2013.01); *F16H 2059/0295* (2013.01); *Y10T 74/19279* (2015.01); *Y10T 74/20177* (2015.01)

(58) Field of Classification Search
CPC ................. F16F 1/046; F16F 3/04; F16F 3/06
USPC ....................... 74/473.36, 473.37, 337.5, 335; 267/155, 168, 154, 157, 273, 275, 285
See application file for complete search history.

(56) References Cited

U.S. PATENT DOCUMENTS 4,510,820 A * 4/1985 Tsuboi ........................ 74/473.16
5,052,404 A * 10/1991 Hodgson ........................ 600/585
(Continued)

FOREIGN PATENT DOCUMENTS

| JP | 54-030339 A | 3/1979 |
|----|-------------|--------|
| JP | 56-039328 A | 4/1981 |

(Continued)

OTHER PUBLICATIONS

Official Communication issued in International Patent Application No. PCT/JP2011/006465, mailed on Mar. 6, 2012.

*Primary Examiner* — William Kelleher
*Assistant Examiner* — Emily Cheng
(74) *Attorney, Agent, or Firm* — Keating and Bennett, LLP

(57) ABSTRACT

A combination torsion spring is configured such that a predetermined reaction force is generated in a coil circumferential direction without a center of a wound coil tilting even when applied with a load. A first torsion spring and a second torsion spring of the combination torsion spring are each provided with a coil. Each coil is formed by spirally winding a copper wire in a different winding direction from one another. The inner diameter of the coil of the first torsion spring is approximately the same as the outer diameter of the coil of the second torsion spring. In the combination torsion spring, the coil of the second torsion spring is inserted into the coil of the first torsion spring.

3 Claims, 26 Drawing Sheets

(51) Int. Cl.
*F16H 63/14* (2006.01)
*F16H 59/02* (2006.01)

(56) References Cited

U.S. PATENT DOCUMENTS

| | | | |
|---|---|---|---|
| 6,145,797 A | 11/2000 | Uehara | |
| 7,059,210 B2 * | 6/2006 | Thiessen et al. | 74/337.5 |
| 7,617,904 B1 * | 11/2009 | Einboeck et al. | 180/336 |
| 7,717,007 B2 * | 5/2010 | Hiroi et al. | 74/335 |
| 7,757,576 B1 * | 7/2010 | Einboeck | 74/335 |
| 2001/0025755 A1 * | 10/2001 | Ota et al. | 192/3.56 |
| 2006/0011006 A1 * | 1/2006 | Suzuki et al. | 74/473.1 |
| 2007/0074594 A1 * | 4/2007 | Mizuno et al. | 74/337.5 |
| 2010/0107792 A1 * | 5/2010 | Saitoh | 74/337.5 |

FOREIGN PATENT DOCUMENTS

| | | |
|---|---|---|
| JP | 61-22945 U | 2/1986 |
| JP | 06-014573 U | 2/1994 |
| JP | 06-144092 A | 5/1994 |
| JP | 10-222079 A | 8/1998 |
| JP | 2008-082365 | 4/2008 |
| JP | 2010-156408 | 7/2010 |

\* cited by examiner

CROSS-SECTIONAL VIEW THROUGH LINE B-B

CROSS-SECTIONAL VIEW THROUGH LINE C-C

CROSS-SECTIONAL VIEW THROUGH LINE D-D

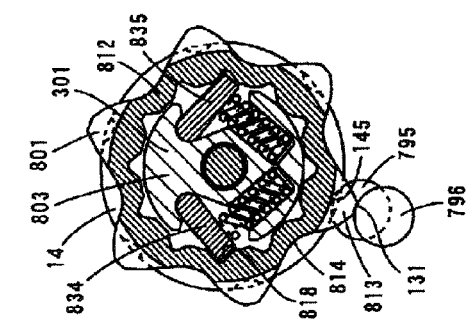
FIG. 19A
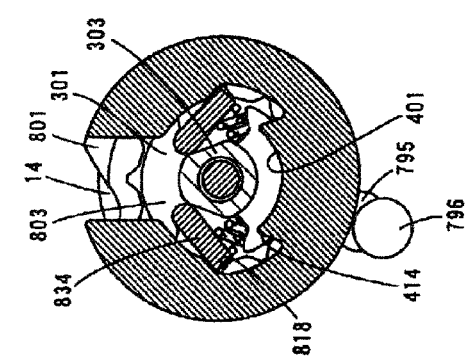
FIG. 19B
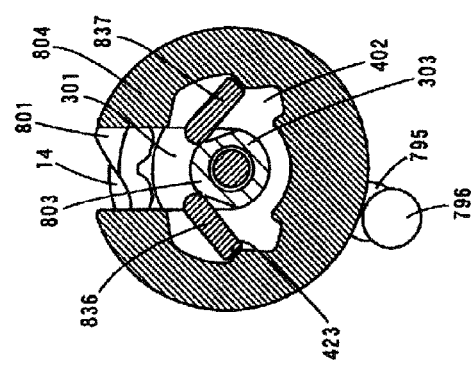
FIG. 19C
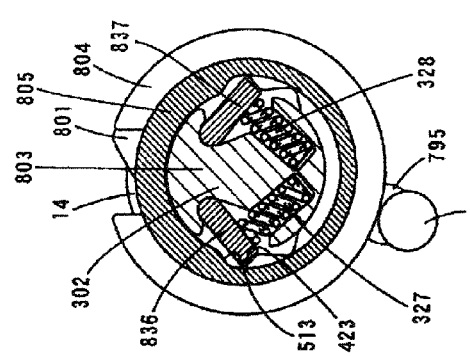
FIG. 19D
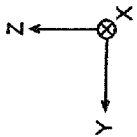

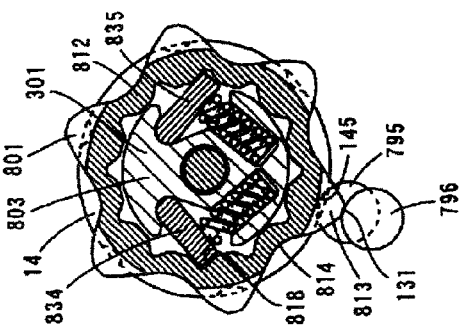
FIG. 20A
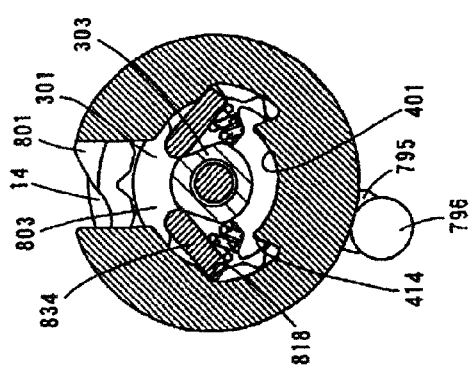
FIG. 20B
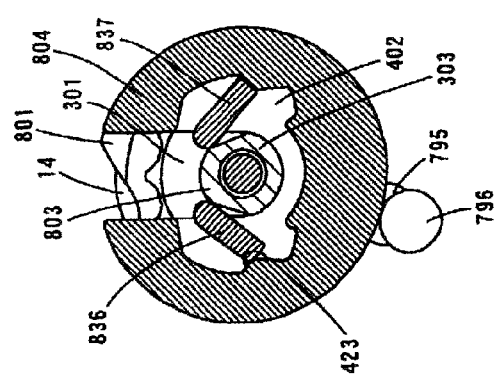
FIG. 20C
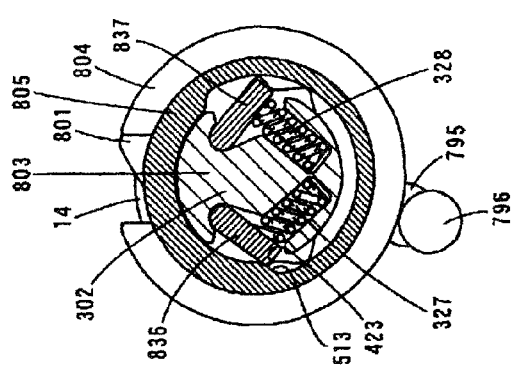
FIG. 20D
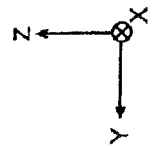

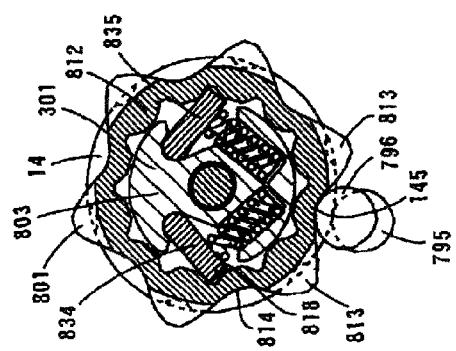
FIG. 24A
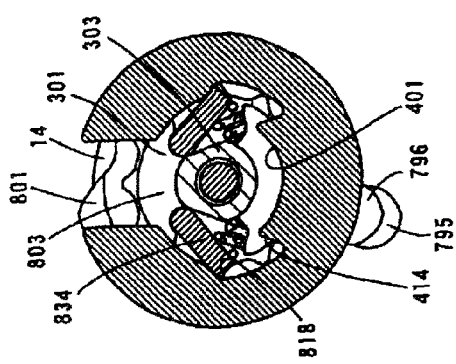
FIG. 24B
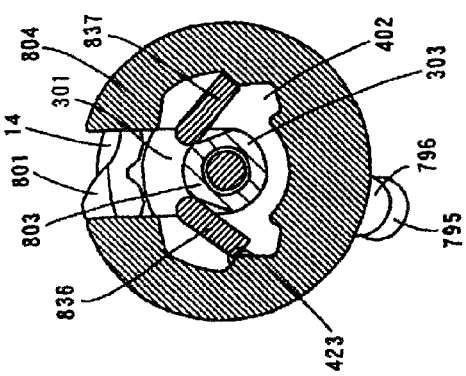
FIG. 24C
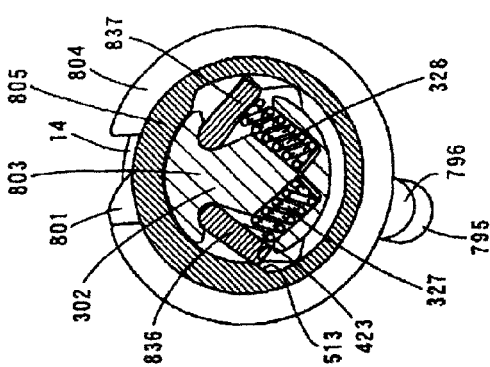
FIG. 24D
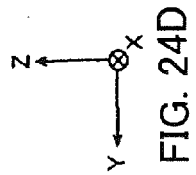

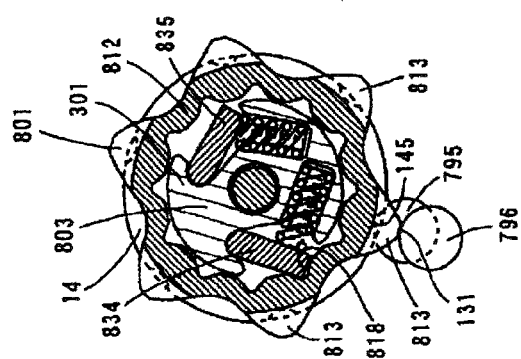
FIG. 25A
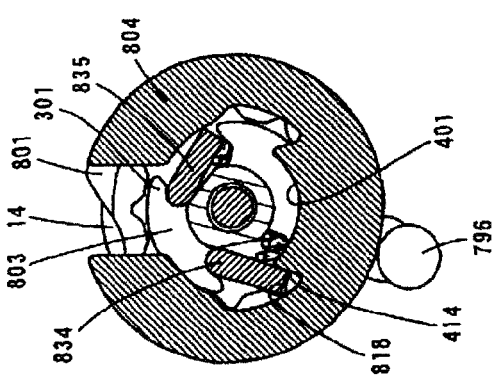
FIG. 25B
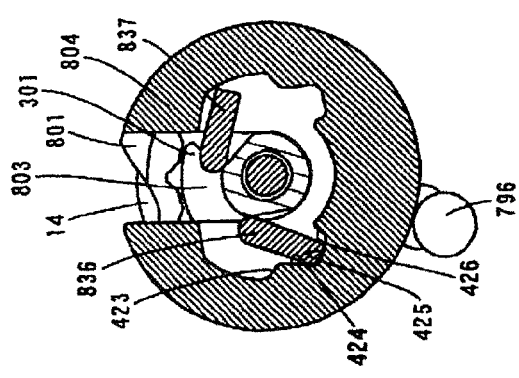
FIG. 25C
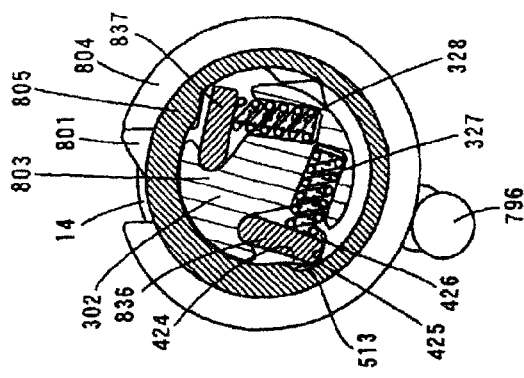
FIG. 25D
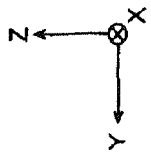

COMBINATION TORSION SPRING, AND SHIFT MECHANISM PROVIDED WITH SAME

BACKGROUND OF THE INVENTION

1. Field of the Invention

The present invention relates to a combination torsion spring and a shift mechanism including the combination torsion spring.

2. Description of the Related Art

Torsion spring (torsion coil spring) 1 (see FIGS. 1A through 1C) that receives a torsional moment (torque) around a winding center axis (coil axis) of a coil section that is formed by winding a steel wire into a coil moves and stops a mechanism of a mechanical component and a mechanism of an electronic instrument. Consequently, torsion spring 1 is used in various ways as, for example, a shock absorber when storing or taking out a vehicle seat or the like as described in Japanese Patent Application Laid-Open No. HEI 6-144092, or a locking apparatus that fixes a display device at an arbitrary position as described in Japanese Patent Application Laid-Open No. HEI 10-222079.

In general, when torsion spring 1 shown in FIG. 1A receives a load in a direction in which hook sections 3 that are formed by bending both ends of coil section 2 to separate from or approach each other in a circumferential direction, as shown in FIG. 1B, a rotational moment M is generated in coil section 2 of torsion spring 1 in accordance with the magnitude of the load acting on hook sections 3. Therefore, in torsion spring 1, from the state shown in FIG. 1B, winding center axis L of coil section 2 inclines relative to the position of central axis L in FIG. 1B, as shown in FIG. 1C. As a result, since the relative distance between hook sections 3 changes in a direction that decreases the loads acting on hook sections 3 (loads in D1 and D2 directions that open to the left and right in FIG. 1B, that is, loads in directions away from each other that are perpendicular to the coil axis that act on hook sections 3), there is the problem that a predetermined reaction force cannot be obtained from torsion spring 1.

Further, when torsion spring 1 receives a load in a direction in which hook sections 3 at both ends of coil section 2 separate from or approach each other in the circumferential direction, stress concentrates at bent sections 3a of hook sections 3, and most of the bending stress in the torsion spring 1 arises at bent sections 3a of hook sections 3. Therefore, from the viewpoint of repeated bending fatigue of the spring material, in general, an upper limit of a load that actuates torsion spring 1 is set by taking into account the bending stress that acts on bent sections 3a of hook sections 3. In other words, since the working load of torsion spring 1 is restricted by the bending stress that acts on bent sections 3a of hook sections 3, in some cases the working load thereof cannot be freely set to a larger amount even if a margin exists with respect to the amount of stress that acts on coil section 2 that is the main body of the spring.

SUMMARY OF THE INVENTION

Preferred embodiments of the present invention provide a combination torsion spring with which a predetermined reaction force in a direction of a coil circumference can be suitably obtained without a winding center of a coil section inclining even under a load, and a shift mechanism including the combination torsion spring.

A combination torsion spring according to a preferred embodiment of the present invention includes a first torsion spring and a second torsion spring each including a coil section in which hook sections are provided at both ends thereof, wherein the first torsion spring and the second torsion spring are arranged so that directions in which the coil sections are wound in a helical shape are different to each other, and an inner diameter of the coil section of the first torsion spring is approximately equal to an outer diameter of the coil section of the second torsion spring, and the coil section of the second torsion spring is inserted through an inside of the coil section of the first torsion spring.

A shift mechanism according to another preferred embodiment of the present invention moves shift forks connected to a gear of a transmission using a bias of a combination torsion spring having the above described configuration, the shift mechanism including a shift cam including, on an outer periphery, cam grooves to which the shift forks are connected, and rotates to move the shift forks at a certain rotation angle; a cam phase holding section that holds the shift cam at phases determined according to a certain rotation angle; a rotating section that is arranged so as to be able to rotate in forward and reverse directions from a reference position, and rotates to rotate the shift cam through the certain rotation angle; a transferring section that rotates in one of the forward and reverse directions from the reference rotation position by rotation power of a motor, and transfers torque to the rotating section via the combination torsion spring in which the bias increases accompanying an increase in a rotation angle of the rotation thereof; and a rotation regulating section that, while the transferring section is rotating in the one direction, regulates the rotation of the rotating section until a predetermined rotation angle is reached and accumulates an increasing bias of the combination torsion spring, and when the rotation angle of the transferring section is at or beyond the predetermined rotation angle, allows the rotation of the rotating section and transfers the bias as torque to the rotating section; in which the rotating section rotates the shift cam that is held by the cam phase holding section using a torque that is biased by the combination torsion spring.

Bias by the combination torsion spring that increases following the rotation of the transferring section in one direction is accumulated, and when the rotation angle of the transferring section reaches a predetermined rotation angle, bias that is accumulated is transferred in the form of a large torque to the rotating section. Thus, a large torque is transferred to a shift cam via a rotating section and moves shift forks and gears connected to the shift forks with great force.

According to a preferred embodiment of the present invention, a predetermined reaction force in a direction of a coil circumference can be suitably obtained without a winding center of a coil section inclining even under a load.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 19A is a drawing for explaining the operation of the shift mechanism.

FIG. 19B is a drawing for explaining the operation of the shift mechanism.

FIG. 19C is a drawing for explaining the operation of the shift mechanism.

FIG. 19D is a drawing for explaining the operation of the shift mechanism.

FIG. 20A is a drawing for explaining the operation of the shift mechanism.

FIG. 20B is a drawing for explaining the operation of the shift mechanism.

FIG. 20C is a drawing for explaining the operation of the shift mechanism.

FIG. 20D is a drawing for explaining the operation of the shift mechanism.

FIG. 24A is a drawing for explaining the operation of the shift mechanism.

FIG. 24B is a drawing for explaining the operation of the shift mechanism.

FIG. 24C is a drawing for explaining the operation of the shift mechanism.

FIG. 24D is a drawing for explaining the operation of the shift mechanism.

FIG. 25A is a drawing for explaining the operation of the shift mechanism.

FIG. 25B is a drawing for explaining the operation of the shift mechanism.

FIG. 25C is a drawing for explaining the operation of the shift mechanism.

FIG. 25D is a drawing for explaining the operation of the shift mechanism.

DETAILED DESCRIPTION OF THE PREFERRED EMBODIMENTS

With reference now to the accompanying drawings, preferred embodiments of the present invention will be explained in detail below.

Figure 1A:
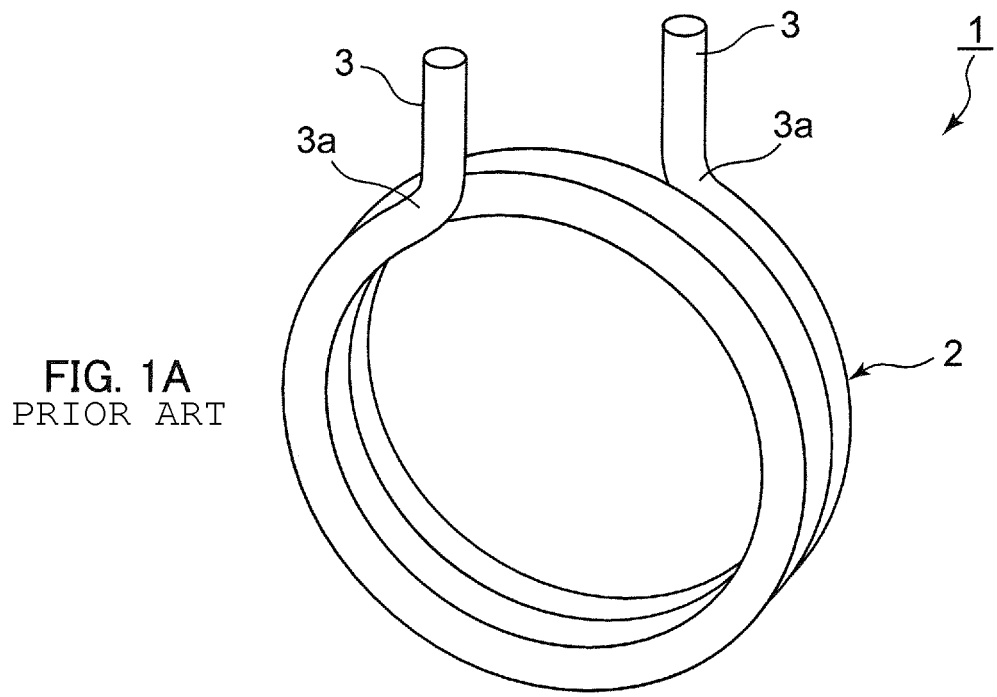
FIG. 1A is a perspective view for explaining a conventional torsion spring.
Figure 1B:
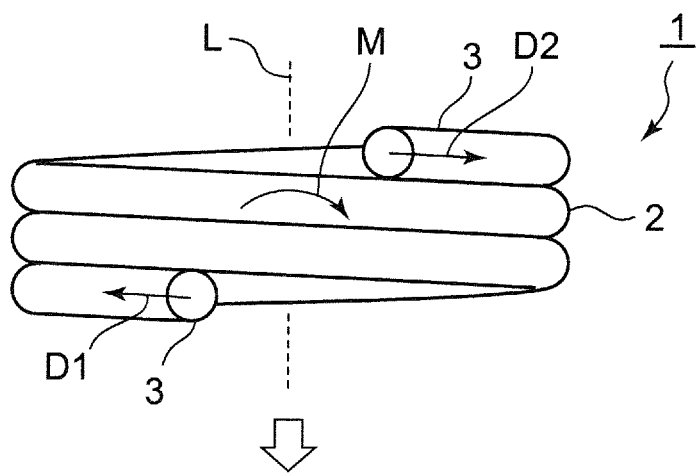
FIG. 1B is a top view for explaining the conventional torsion spring.
Figure 1C:
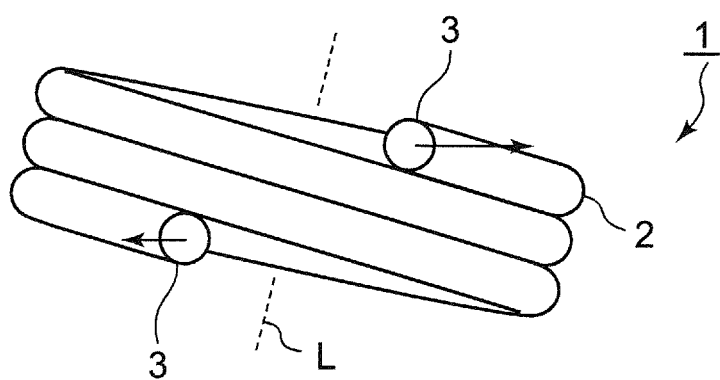
FIG. 1C is a top view for explaining the conventional torsion spring.
Figure 2:
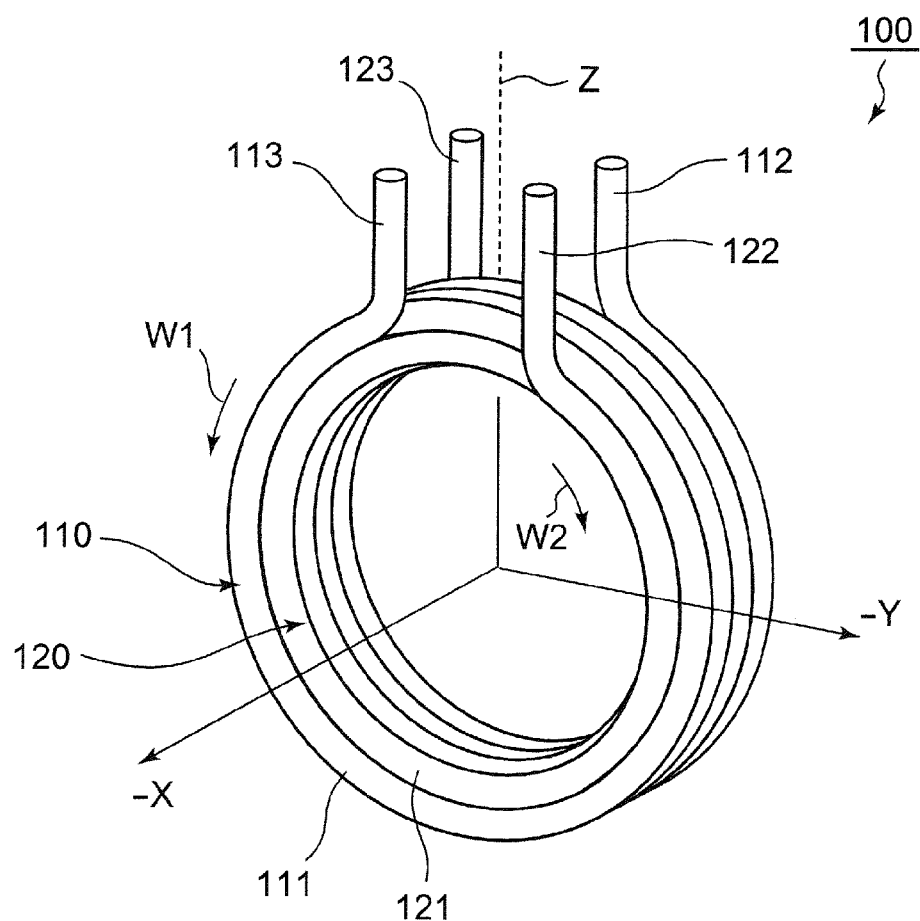
FIG. 2 is a perspective view of a combination spring according to a preferred embodiment of the present invention.
Figure 3:
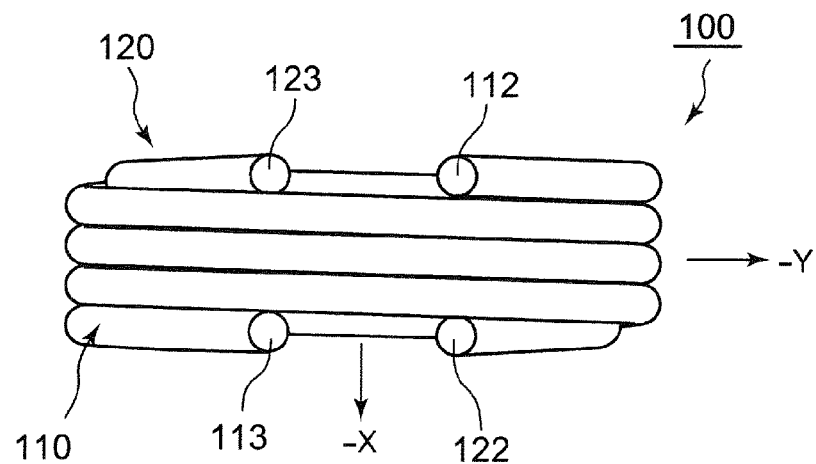
FIG. 3 is a plan view of the combination spring shown in FIG. 2.

Combination torsion spring (hereafter, referred to as "combination spring") 100 shown in FIG. 2 and FIG. 3 includes first torsion spring 110 and second torsion spring 120. Note that, in FIG. 2 and FIG. 3, combination spring 100 is shown as a combination spring that is in a predetermined attachment state.

First torsion spring 110 and second torsion spring 120 include coil sections 111 and 121, respectively, that are formed by winding steel wires in a helical shape in mutually different winding directions. In this case, as viewed from an X-direction side, coil section 111 of first torsion spring 110 is formed in a tubular shape by winding a steel wire in a helical shape in the clockwise direction (W1 direction) from one end (end on a side of hook section 113 that is described below). On the other hand, coil section 121 of second torsion spring 120 is formed in a tubular shape by winding a steel wire in a helical shape from one end (end on a side of hook section 122 that is described below) in a winding direction (W2 direction; corresponds to the counterclockwise direction as viewed from the X-direction side) that is different to the winding direction of first torsion spring 110. In this case, it is assumed that the steel wires having the same thickness (cross section) are used as the steel wires that form first torsion spring 110 and second torsion spring 120.

Combination spring 100 is constituted by combining first torsion spring 110 and second torsion spring 120 so that coil sections 111 and 121 overlap in a manner in which their respective axes are coaxial.

Specifically, the inner diameter of coil section 111 of first torsion spring 110 and the outer diameter of coil section 121 of second torsion spring 120 are approximately the same. Coil section 121 of second torsion spring 120 is inserted through the inside of coil section 111 of first torsion spring 110.

First torsion spring 110 and second torsion spring 120 include rod-shaped hook sections 112 and 113, and 122 and 123 that are bent in the radial direction from both ends of respective coil sections 111 and 121.

In first torsion spring 110, respective hook sections 112 and 113 protrude in parallel or substantially in parallel with each other from the two ends of coil section 111. Likewise, in second torsion spring 120, respective hook sections 122 and 123 protrude in parallel or substantially in parallel with each other from the two ends of coil section 121.

As shown in FIG. 3, in first torsion spring 110 and second torsion spring 120, hook section 112 of first torsion spring 110 and hook section 122 of second torsion spring 120 are arranged so as to be aligned along the winding center axis of the coils. Further, hook section 113 of first torsion spring 110 and hook section 123 of second torsion spring 120 are arranged so as to be aligned along the winding center axis of the coils.

In this case, hook section 112 and hook section 122 are arranged in an aligned manner in parallel or substantially in parallel with the winding center axis (X direction) of the coils, and hook section 113 and hook section 123 are arranged in an aligned manner in parallel or substantially in parallel with the winding center axis (X direction) of the coils. Thus, in combination spring 100, first torsion spring 110 and second torsion spring 120 are combined so that coil section 121 of second torsion spring 120 is inserted inside coil section 111 of first torsion spring 110 so as to be movable in the circumferential direction, and so that hook sections 112, 113, 122, and 123 are positioned at positions that sandwich coil sections 111 and 121 in the direction of the winding center axis of the coils.

Figure 4:
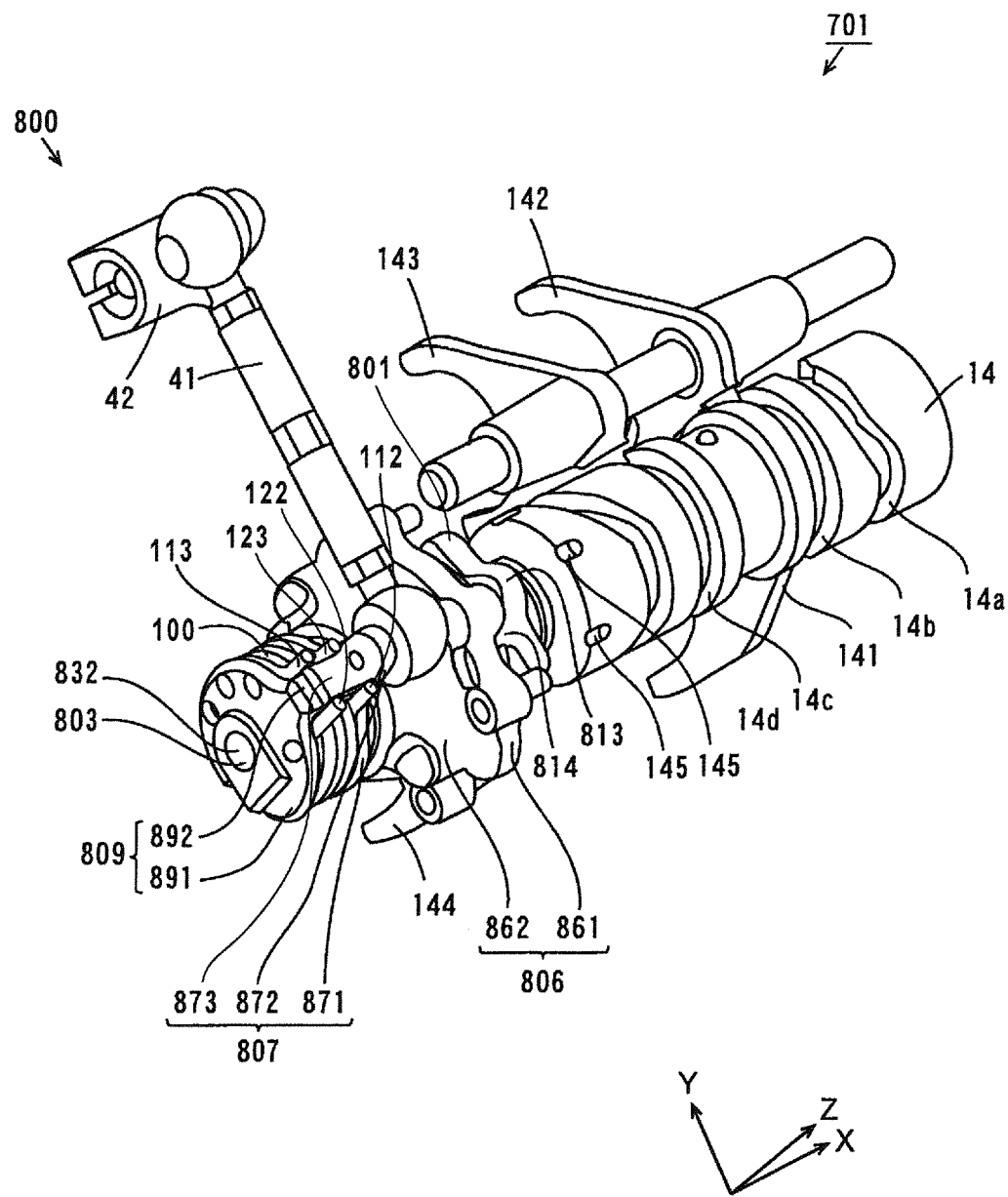
FIG. 4 is a perspective view showing a shift mechanism equipped with the combination spring shown in FIG. 2.

In addition, in FIG. 2 and FIG. 3, combination spring 100 is in a predetermined attachment state, and an initial bias in a direction in which hook section 112 and hook section 113 approach each other in the circumferential direction is applied to first torsion spring 110 by members that impart a load to hook sections 112 and 113 (for example, latch sections 873 and 892 shown in FIG. 4). Further, an initial bias in a direction in which hook section 122 and hook section 123 approach each other in the circumferential direction is applied to second torsion spring 120 by members that impart a load to hook sections 122 and 123 (for example, latch sections 873 and 892 shown in FIG. 4).

In combination spring 100, first torsion spring 110 and second torsion spring 120 perform the same action at the same time. That is, hook section 112 of first torsion spring 110 and hook section 122 of second torsion spring 120 are moved simultaneously in the circumferential direction relative to hook section 113 of first torsion spring 110 and hook section 123 of second torsion spring 120. Similarly, hook sections 113 and 123 are moved in the circumferential direction relative to hook sections 112 and 122.

Thus, when the set of hook sections 112 and 122 and the set of hook sections 113 and 123 move in the circumferential direction of coil sections 111 and 121 so as to move away from each other relatively, bias is accumulated in coil sections 111 and 121.

In combination spring 100 constituted in this manner, as shown in FIG. 3, when a force in direction P in which the set of hook sections 123 and 113 and the set of hook sections 112 and 122 move away from each other acts on the aforementioned sets of hook sections, stress (a load) applied at bent sections between hook sections 112, 113, 122, and 123 and coil sections 111 and 121 is dispersed to and shared by both first torsion spring 110 and second torsion spring 120, and thus the stress applied to respective hook sections 112, 113, 122, and 123 is reduced by half in comparison to hook sections in the case of a single torsion spring. That is, in first torsion spring 110 and second torsion spring 120, stress applied to hook sections 112, 113, 122, and 123 can be markedly reduced.

Further, when a force in direction P in which the set of hook sections 123 and 113 and the set of hook sections 112 and 122 move away from each other acts on the aforementioned sets of hook sections, rotational moments are generated in each of coil section 111 that exists between hook sections 112 and 113 and coil section 121 that exists between hook sections 122 and 123 so as to cause the respective winding center axes to incline.

However, since the winding directions of coil sections 111 and 121 are different to each other, the rotational moments generated in respective coil sections 111 and 121 approximately cancel each other out. Therefore, in combination spring 100, inclination of the winding center axis of the coil that is the center of winding is prevented in each of coil sections 111 and 121. Consequently, when using combination spring 100, a desired reaction force can be effectively obtained without requiring a member that regulates inclination of the winding center axis of the coil of respective torsion springs 110 and 120.

Combination spring 100 configured as described above can be used in mechanisms in various fields to obtain a desired reaction force, that is, to move a member of the mechanism due to the accumulated bias.

A shift mechanism will now be described as a mechanism in which combination spring 100 is provided.

Figure 5:
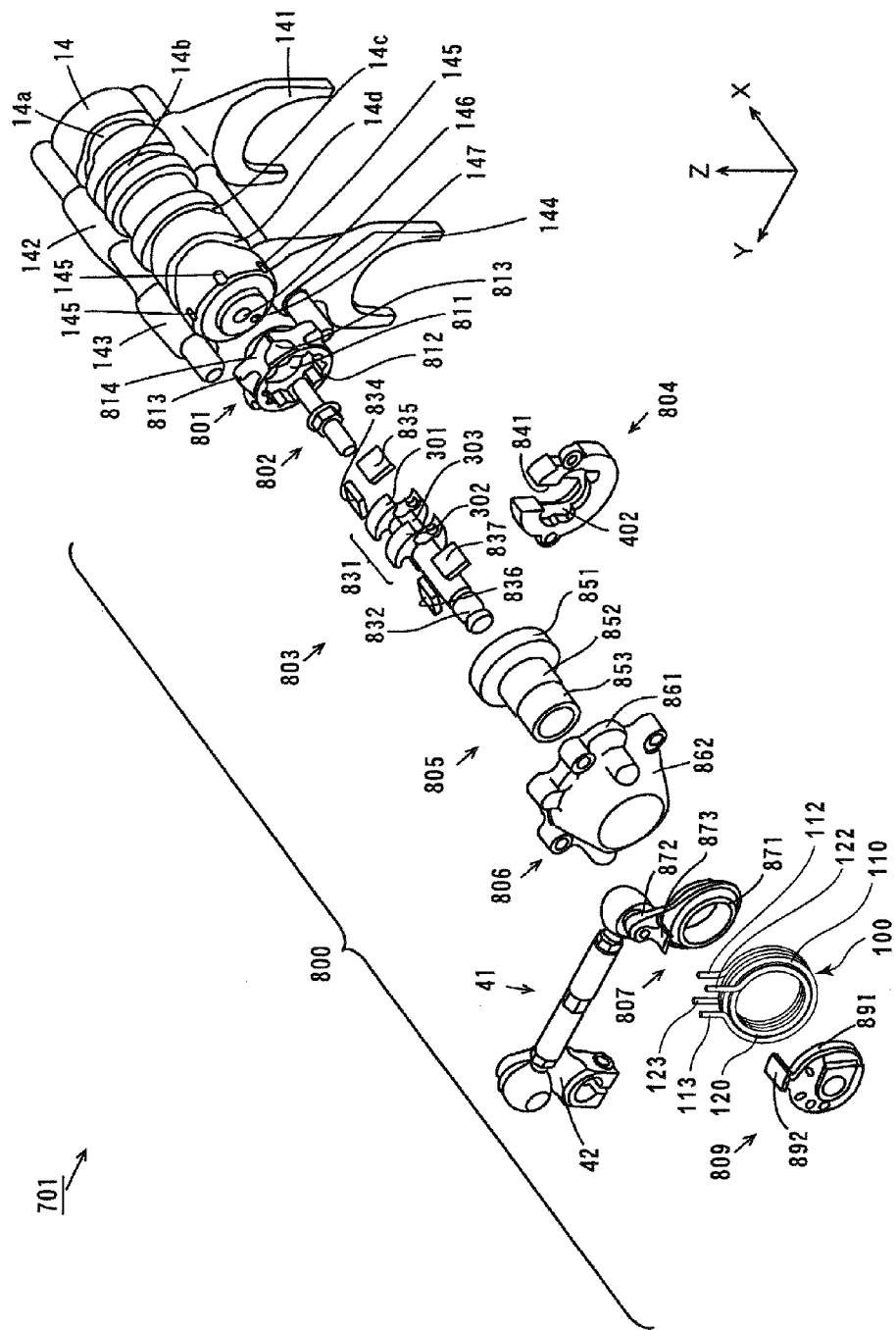
FIG. 5 is an exploded perspective view of the shift mechanism shown in FIG. 4.
Figure 6:
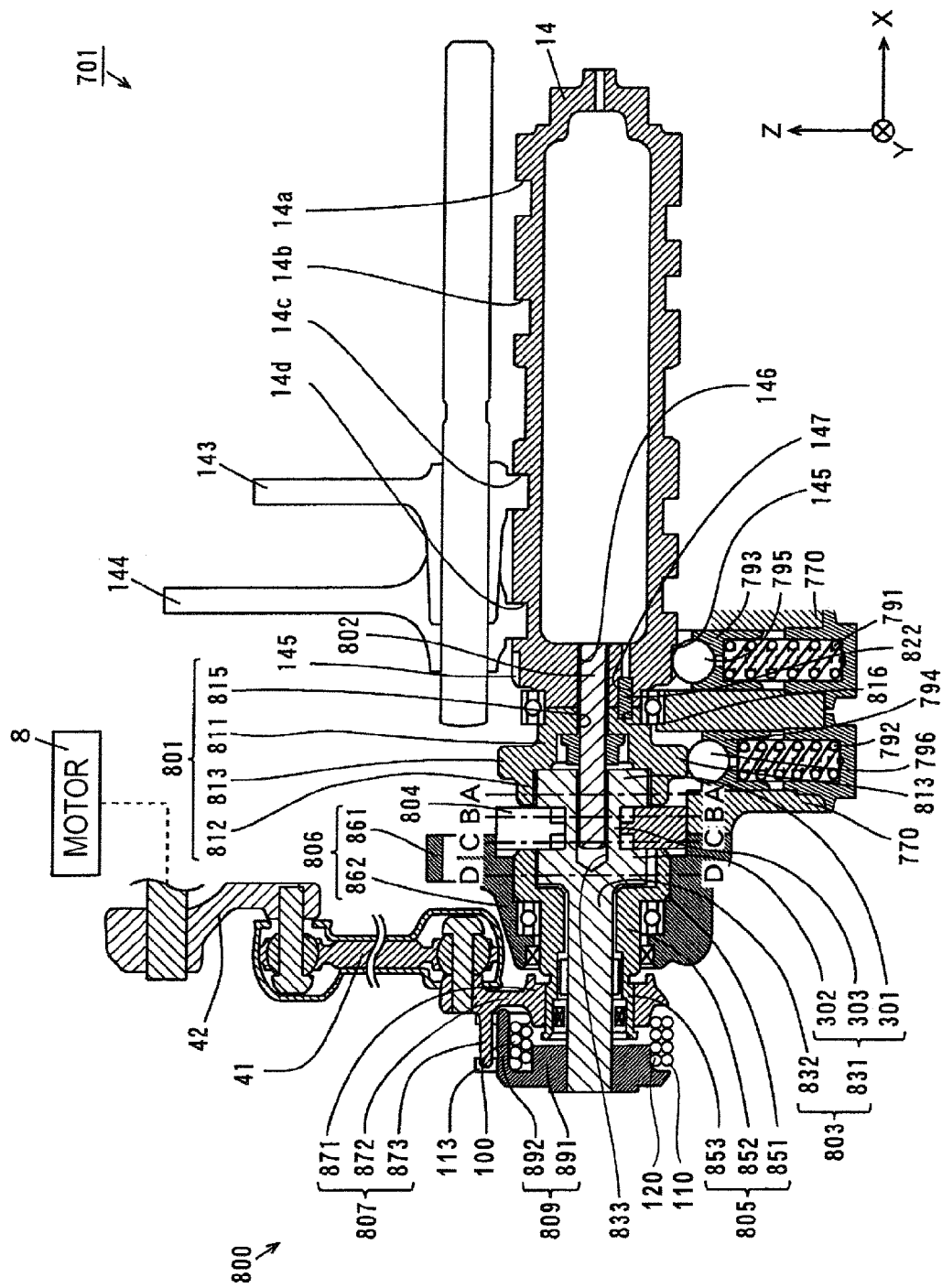
FIG. 6 is a cross-sectional view of the shift mechanism shown in FIG. 4.
Figure 7:
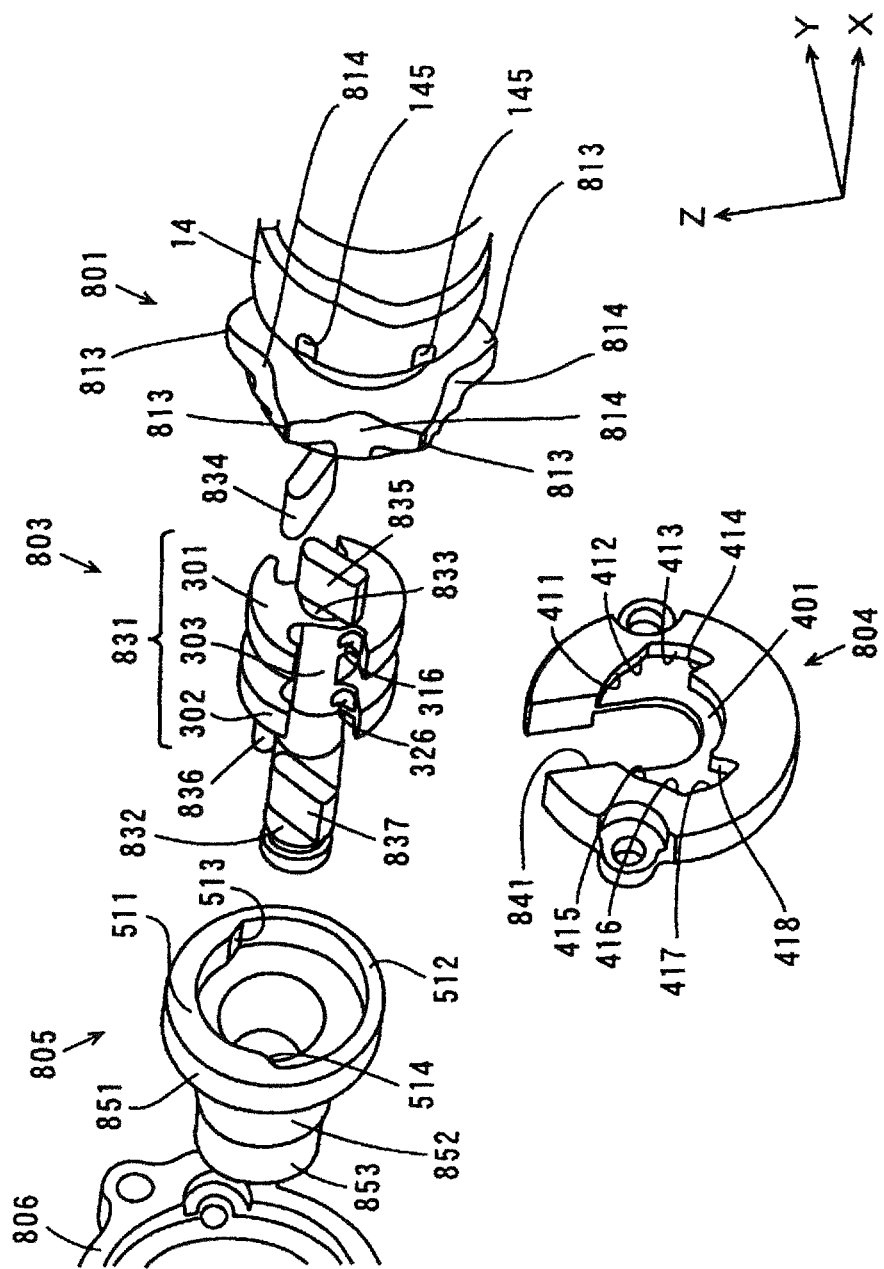
FIG. 7 is an exploded perspective view showing a portion of the shift mechanism shown in FIG. 4.

FIG. 4 is a perspective view of shift mechanism 701, FIG. 5 is an exploded perspective view of shift mechanism 701, and FIG. 6 is a cross-sectional view of shift mechanism 701. FIG. 7 is a partial exploded perspective view showing a portion of shift mechanism 701 viewed from a different direction to that in FIG. 4. In FIG. 4 through FIG. 7, and in following FIG. 8 through FIG. 16, shift mechanism 701 is illustrated in a standard state (see FIG. 15).

In FIG. 4 through FIG. 7, and in following FIG. 8 through FIG. 26, mutually orthogonal X-direction, Y-direction, and Z-direction arrows are provided to clarify positional relationships. The X direction and Y direction are mutually orthogonal in the horizontal plane, and the Z direction corresponds to the vertical direction. For each direction, the direction in which an arrow is pointed denotes the + direction, and the opposite direction denotes the − direction. For the Z direction, the direction in which an arrow is pointed denotes the upward direction, and the opposite direction denotes the downward direction.

As shown in FIG. 4 through FIG. 6, shift mechanism 701 includes shift cam 14, shift forks 141 through 144, and shift cam drive unit 800 that is equipped with combination spring 100.

Shift cam 14 preferably has a cylindrical or substantially cylindrical shape. Four cam grooves 14a through 14d are preferably provided in the outer periphery of shift cam 14, and pin sections at the base end of shift forks 141 through 144 are arranged so as to be movable within the respective grooves of four cam grooves 14a through 14d. The shift forks 141 through 144 are movable in the axial direction of the rotation axis of shift cam 14 in accordance with the shape of cam grooves 14a through 14d of rotating shift cam 14. Also, a plurality of groove sections 145 are provided in one end of the outer peripheral surface of shift cam 14. In this preferred embodiment, six groove sections 145 are preferably provided at 60° intervals around the axial center of shift cam 14. As shown in FIG. 5 and FIG. 6, through hole 146 is provided in a center portion of one side surface of shift cam 14. Also, latch hole 147 is provided at a position deviating from the center portion of the other side surface of shift cam 14.

As shown in FIG. 4 through FIG. 6, shift cam drive unit 800 includes first rotating member 801, positioning shaft 802 (FIG. 5 and FIG. 6), second rotating member 803, regulating member 804 (FIG. 5 and FIG. 6), third rotating member 805 (FIG. 5 and FIG. 6), accommodating member 806, first transferring member 807, combination spring 100, and second transferring member 809.

As shown in FIG. 5 and FIG. 6, first rotating member 801 includes small-diameter cylindrical section 811 and large-diameter cylindrical section 812. As shown in FIG. 4 through FIG. 7, a plurality of projecting sections 813 with an approximately triangular cross-section are provided on the outer periphery of first rotating member 801 so as to project radially outward. In this preferred embodiment, six projecting sections 813 are preferably provided at 60° intervals around the axial center of first rotating member 801. Also, concave sections 814 defined by adjacent projecting sections 813 are arranged in the circumferential direction.

As shown in FIG. 6, through hole 815 is provided in the center portion of a side surface of cylindrical section 811. Also, latch hole 816 is provided at a position deviating from the center portion of a side surface of cylindrical section 811.

One end of positioning shaft 802 is inserted into through hole 146 and through hole 815. Thus, the rotation axis of shift cam 14 and the rotation axis of first rotating member 801 are provided on the same axis line. Also, cylindrical section 811 and shift cam 14 are coupled so that latch member 822 is fitted into latch hole 147 and latch hole 816. Thus, it becomes possible for shift cam 14 and first rotating member 801 to rotate integrally.

Springs 791 and 792 are provided inside mission case 770. Moving member 793 is abutted against one end of spring 791. Moving member 793 is provided so as to be movable in the axial direction of spring 791. Also, moving member 794 is abutted against one end of spring 792. Moving member 794 is provided so as to be movable in the axial direction of spring 792.

Ball 795 is provided between moving member 793 and one end of the outer peripheral surface of shift cam 14. Ball 795 is biased toward shift cam 14 by spring 791 via moving member 793. Also, ball 796 is provided between moving member 794 and the outer peripheral surface of first rotating member 801 (an area defined by projecting section 813 and concave section 814 (FIG. 5)).

Ball 796 is biased toward first rotating member 801 by spring 792 via moving member 794. Details of first rotating member 801 will be given below. First rotating member 801, projecting section 813, concave section 814, springs 791 and 792, balls 795 and 796 and so on correspond to a cam phase holding device arranged to hold shift cam 14 in phases determined per a certain rotation angle (for example, 30° with the present preferred embodiment). Groove section 145, concave section 814, springs 791 and 792, balls 795 and 796 and so on correspond to a torque supply section to supply torque to shift cam 14. In this case, the set of spring 792, moving member 794, ball 796, projecting section 813 and concave section 814, and the set of spring 791, moving member 793, ball 795 and groove section 145 are each able to supply torque to the rotation direction while shift cam 14 is rotating.

As shown in FIG. 5 through FIG. 7, second rotating member 803 includes rotor 831 and shaft section 832 arranged so as to extend in the axial direction of that rotor 831. As shown in FIG. 6 and FIG. 7, cylindrical hole 833 is provided in the axial center section of rotor 831.

As shown in FIG. 5 through FIG. 7, rotor 831 includes first ratchet 301, second ratchet 302, and cylindrical coupling section 303 that is provided so as to couple first ratchet 301 and second ratchet 302.

As shown in FIG. 5 and FIG. 7, lug plates 834 and 835 are attached to first ratchet 301, and lug plates 836 and 837 are attached to second ratchet 302.

As shown in FIG. 6, the other end of positioning shaft 802 is inserted into hole 833. Thus, the rotation axis of shift cam 14, the rotation axis of first rotating member 801, and the rotation axis of second rotating member 803 are provided on the same axis line. Thus, an installation space in a direction perpendicular or substantially perpendicular to the rotation axis of shift cam 14, the rotation axis of first rotating member 801, and the rotation axis of second rotating member 803 is decreased without each of the aforementioned rotation axes being aligned parallel to each other. First ratchet 301 is accommodated inside cylindrical section 812.

As shown in FIG. 5 and FIG. 7, regulating member 804 is disk-shaped. As shown in FIG. 7, first concave section 401 is provided in the center portion of the surface of regulating member 804 on the +X direction side. Also, as shown in FIG. 5, second concave section 402 is provided in the center portion of the surface of regulating member 804 on the −X direction side.

Also, as shown in FIG. 5 and FIG. 7, latch section 841 is provided on regulating member 804 so as to extend upward from the center portion. As shown in FIG. 6, coupling section 303 of second rotating member 803 is fitted into latch section 841.

As shown in FIG. 5 through FIG. 7, third rotating member 805 includes first cylindrical section 851, second cylindrical section 852, and third cylindrical section 853. As shown in FIG. 6, second rotating member 803 is provided rotatably inside third rotating member 805, second ratchet 302 is accommodated inside first cylindrical section 851, and one end of shaft section 832 projects from one end of third cylindrical section 853.

As shown in FIG. 4 through FIG. 6, accommodating member 806 includes flange 861 and cylindrical accommodating section 862. As shown in FIG. 6, flange 861 is attached to mission case 770. Thus, accommodating member 806 is fixed. Regulating member 804 is fixed to accommodating member 806.

Third rotating member 805 is provided rotatably inside accommodating member 806. First cylindrical section 851 and second cylindrical section 852 are accommodated inside accommodating section 862. Third cylindrical section 853 projects from one end of accommodating member 806.

As shown in FIG. 4 through FIG. 6, first transferring member 807 includes disk-shaped main unit 871 and coupling section 872. Coupling section 872 is arranged so as to extend upward from the outer periphery of main unit 871. Plate-shaped latch section 873 is provided on coupling section 872 so as to extend in the −X direction.

As shown in FIG. 6, main unit 871 is fixed to third cylindrical section 853 in third rotating member 805. Also, as shown in FIG. 4 through FIG. 6, coupling section 872 is coupled to one end of drive mechanism 41. The other end of drive mechanism 41 is coupled to the rotating shaft (not shown) of motor 8 (see FIG. 6). Third rotating member 805 and first transferring member 807 correspond to a transferring section that rotates by rotation power of motor 8 (see FIG. 6) in one of the forward and reverse directions from the reference rotation position, and by transferring that rotation to the rotating section (second transferring member 809, second rotating member 803, first ratchet 301, and first rotating member 801) via combination spring 100, makes the rotating section rotate.

Combination spring 100 increases its bias following an increase in the rotation angle of the rotation of third rotating member 805, first transferring member 807, or a corresponding transmitting device in one direction. That is, in the combination spring, accompanying rotation of the transferring section in one of the forward and reverse directions from the reference rotation position, hook section 113 at the one end of coil section 111 of first torsion spring 110 and hook section 123 at the other end of coil section 121 of second torsion spring 120 accumulate the aforementioned bias by moving in the circumferential direction of respective coils 111 and 121 simultaneously relative to hook section 112 at the other end of coil section 111 of first torsion spring 110 and hook section 122 at the one end of coil section 121 of second torsion spring 120.

Combination spring 100 accumulates an increasing bias of combination spring 100 together with latch section 873, first transferring member 807, third rotating member 805, regulating member 804, second ratchet 302, second rotating member 803, second transferring member 809, and latch section 892. Regulating member 804, second ratchet 302, second rotating member 803, and third rotating member 805 correspond to a rotation regulating section. The rotation regulating section regulates the rotation of the rotating section defined by second transferring member 809, second rotating member 803, first ratchet 301, and first rotating member 801 until a predetermined rotation angle is reached during rotation of third rotating member 805 and first transferring member 807 in one direction. Further, when rotation in one direction of third rotating member 805 and first transferring member 807 is at or beyond a predetermined rotation angle, regulating member 804, second ratchet 302, and third rotating member 805 enable rotation of the rotating section in the one direction that is the rotation direction of third rotating member 805 and first transferring member 807. When the rotation angle of third rotating member 805 and first transferring member 807 is at or beyond the predetermined rotation angle, the rotating section (first rotating member 801, second rotating member 803, second transferring member 809, and first ratchet 301) transfers torque that is accumulated by combination spring 100 and that is biased towards second transferring member 809 and second rotating member 803 in the form of torque to first rotating member 801 via first ratchet 301.

Second transferring member 809 includes disk-shaped main unit 891 and latch section 892, having an approximately L-shaped cross-section, provided on the upper portion of main unit 891. Latch section 892 is arranged so that its front end extends in the +X direction. Second transferring member 809 and second rotating member 803 correspond to a rotating device that rotates shift cam 14 at a certain rotation angle (30°, for example). When rotation in the one direction of the rotating section that had been regulated by the rotation regulating section (regulating member 804, second ratchet 302, second rotating member 803, and third rotating member 805) is enabled, torque that is accumulated by combination spring 100 and that is biased towards second transferring member 809 and second rotating member 803 is transferred to first rotating member 801 via first ratchet 301. Thus, the rotating section rotates at a certain rotation angle (for example, 30°) in the one direction together with shift cam 14 that is held by the cam phase holding section.

As shown in FIG. 4 and FIG. 6, main unit 891 of second transferring member 809 is fixed to one end of shaft section 832 in second rotating member 803. One end of main unit 871 in first transferring member 807 and one end of main unit 891 in second transferring member 809 are fitted inside the inner diameter of combination spring 100 (inner diameter of second torsion spring 120). Thus, main unit 871 and main unit 891 become the approximate rotation axis of combination spring 100.

As shown in FIG. 4, latch section 873 of first transferring member 807 and latch section 892 of second transferring member 809 are arranged between a hook set of hook sections 122 and 112 (hereafter, may also be referred to as "first hook set") and a hook set of hook sections 113 and 123 (hereunder, may also be referred to as "second hook set") of combination spring 100. Also, as shown in FIG. 4 and FIG. 6, latch section 873 is provided above latch section 892, with a gap between the two.

The first hook set or the second hook set is pressed by relative movement of latch section 873 and latch section 892, and moves around the rotation axis. Thus, bias is accumulated in coil sections 111 and 121 in combination spring 100.

Here, the internal configuration of shift cam drive unit 800 will now be described with reference to the accompanying drawings.

Figure 8:
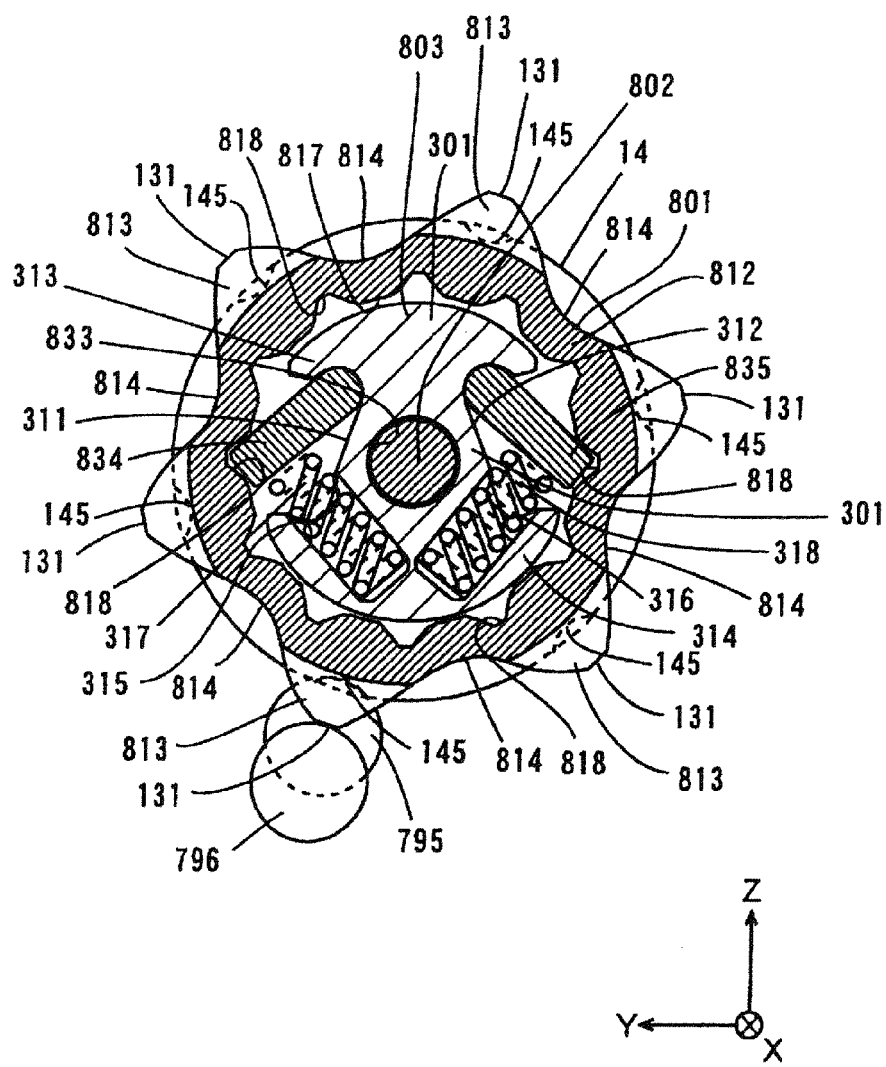
FIG. 8 is a cross-sectional view through line A-A in FIG. 6.
Figure 9:
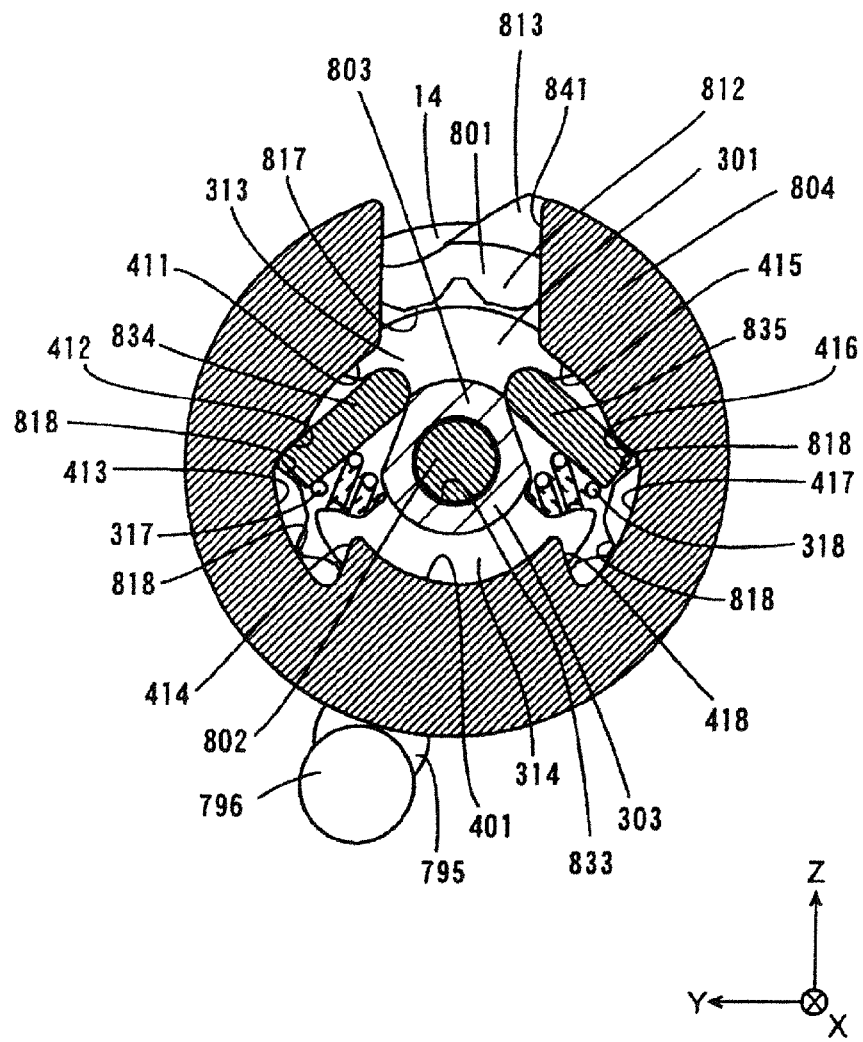
FIG. 9 is a cross-sectional view through line B-B in FIG. 6.
Figure 10:
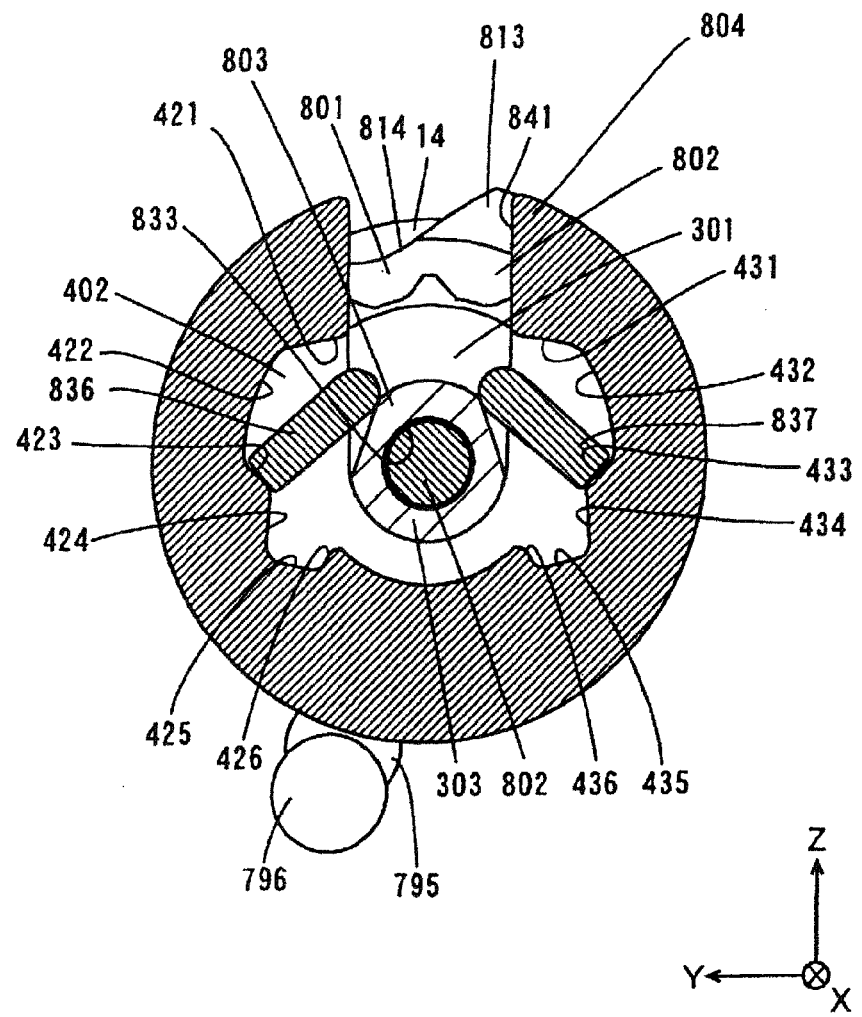
FIG. 10 is a cross-sectional view through line C-C in FIG. 6.
Figure 11:
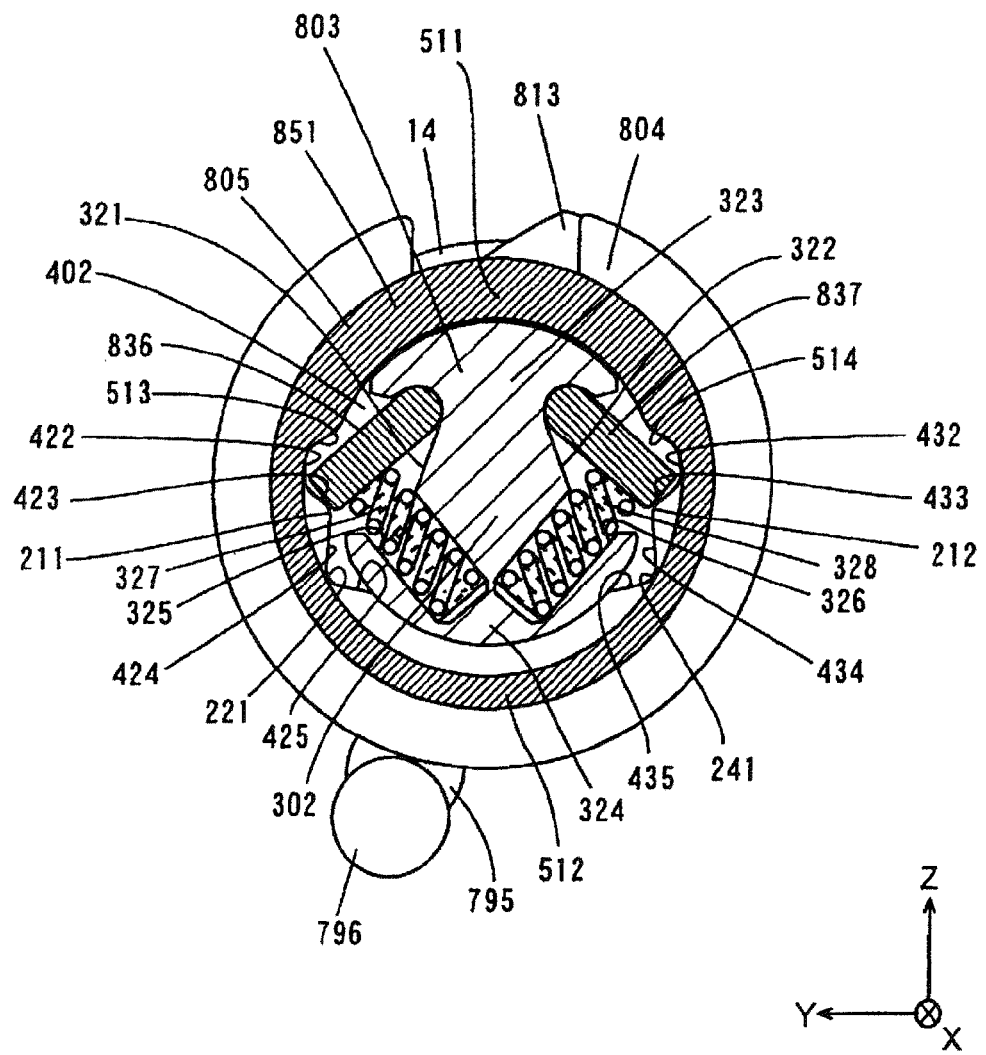
FIG. 11 is a cross-sectional view through line D-D in FIG. 6.
Figure 12:
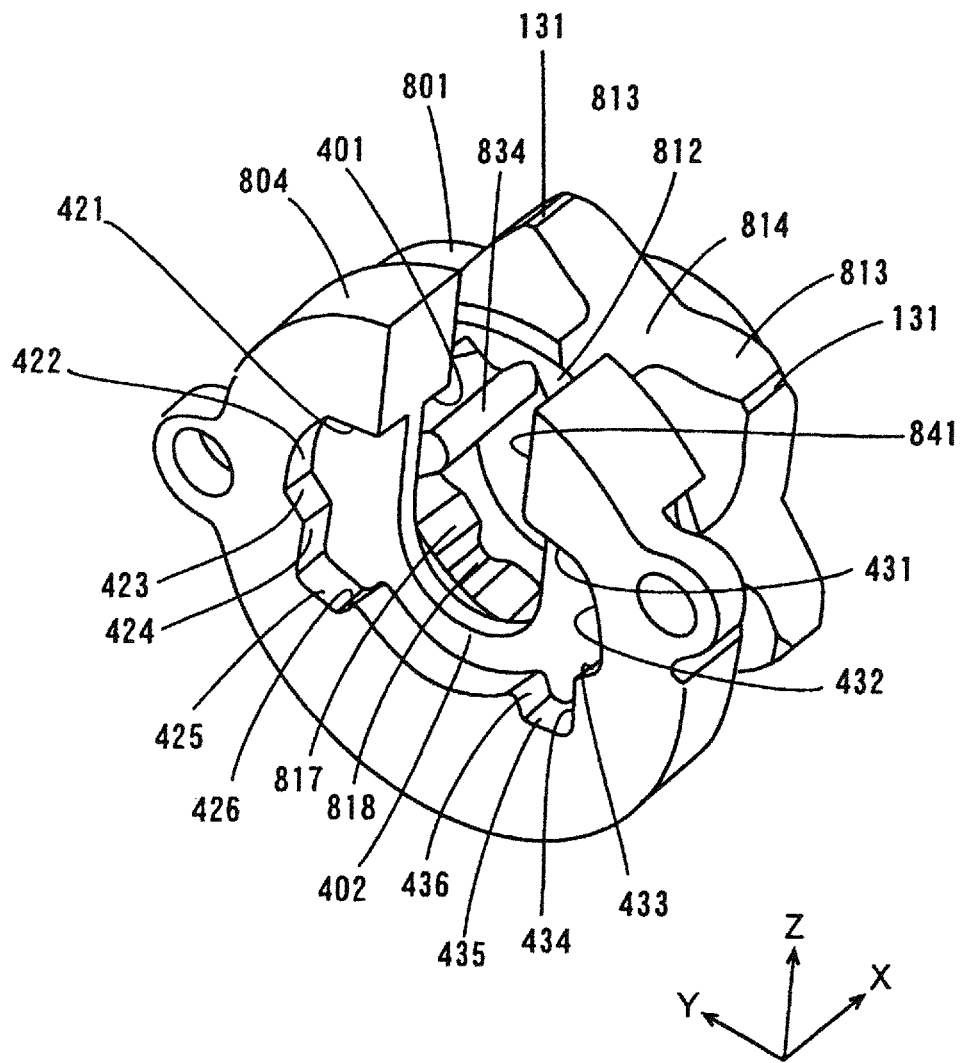
FIG. 12 is a perspective view showing a first rotating member and a regulating member.
Figure 13:
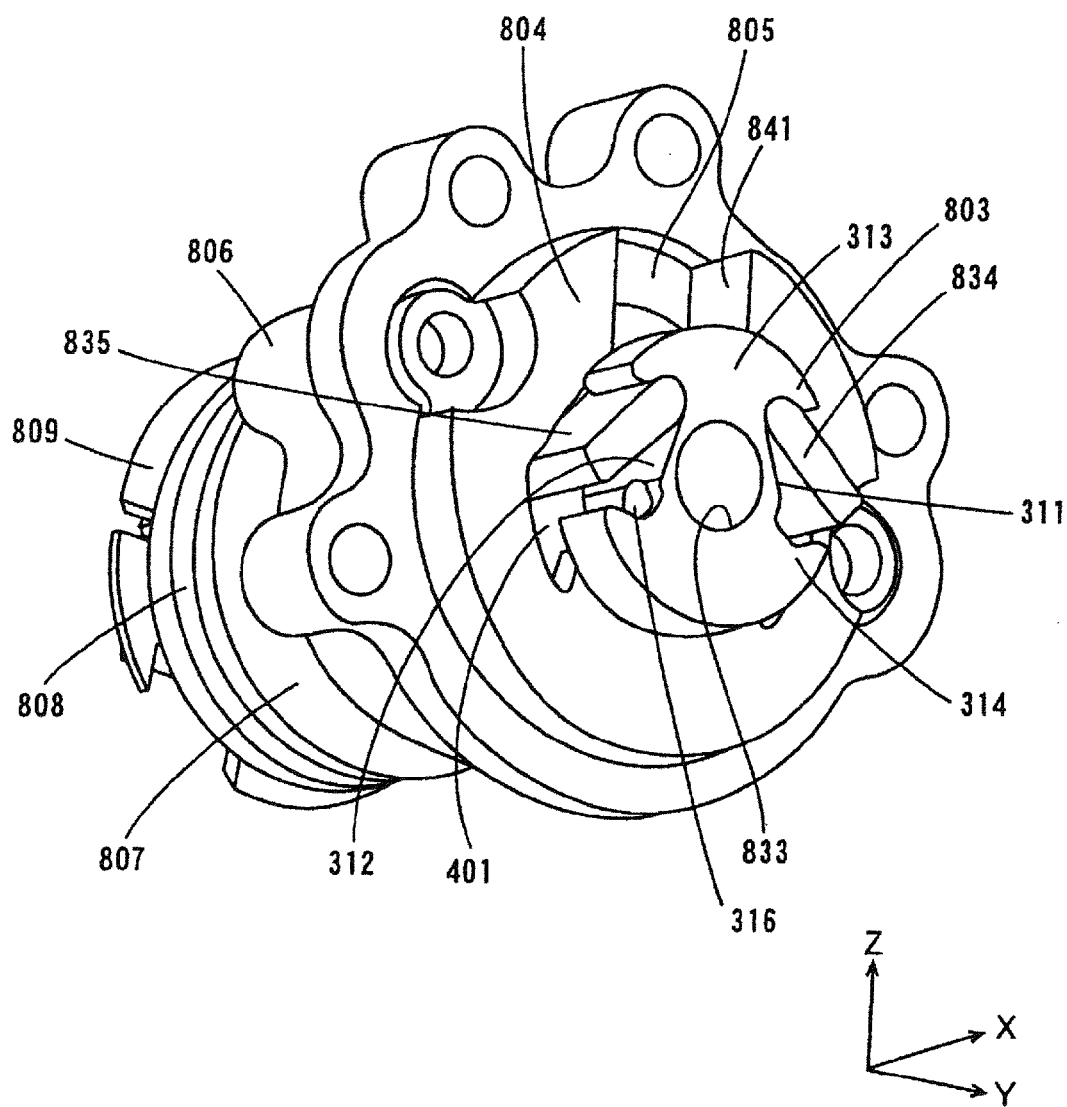
FIG. 13 is a perspective view showing a second rotating member, a regulating member, a third rotating member, an accommodating member, a first transferring member, a combination spring, and a second transferring member.
Figure 14:
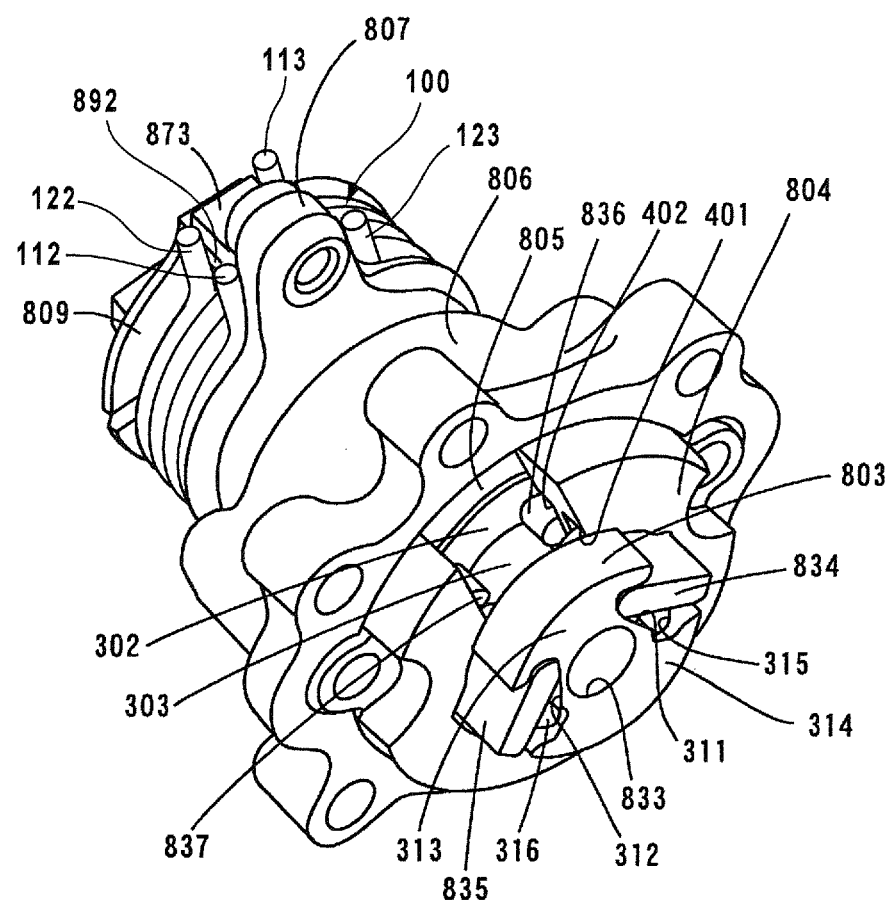
FIG. 14 is a perspective view showing a second rotating member, a regulating member, a third rotating member, an accommodating member, a first transferring member, a combination spring, and a second transferring member.
Figure 15:
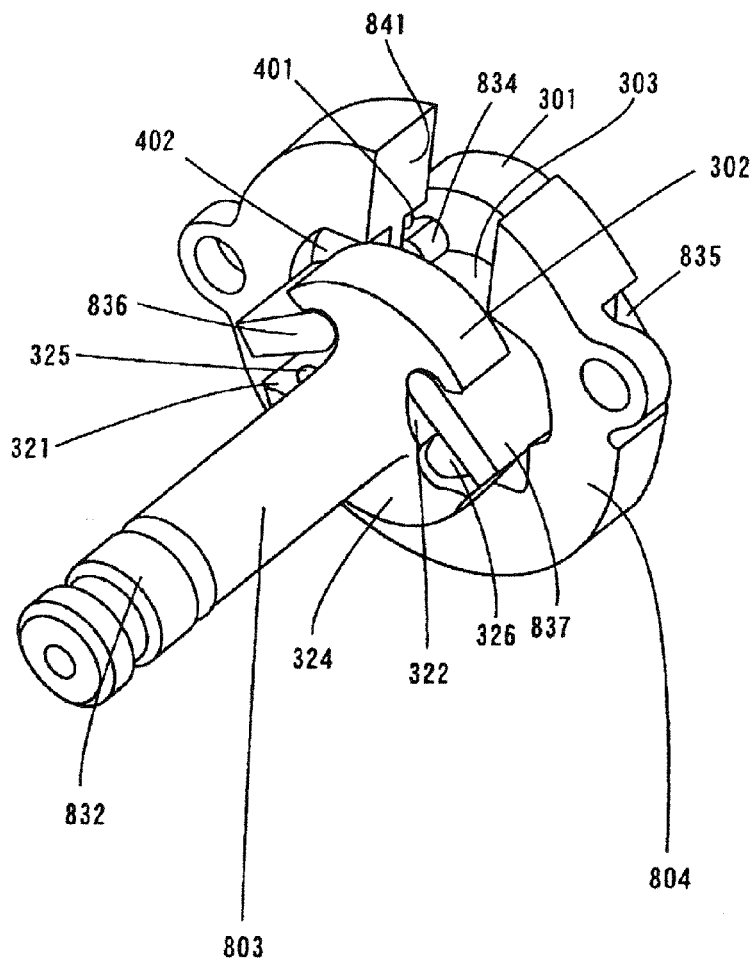
FIG. 15 is a perspective view showing a second rotating member and a regulating member.
Figure 16:
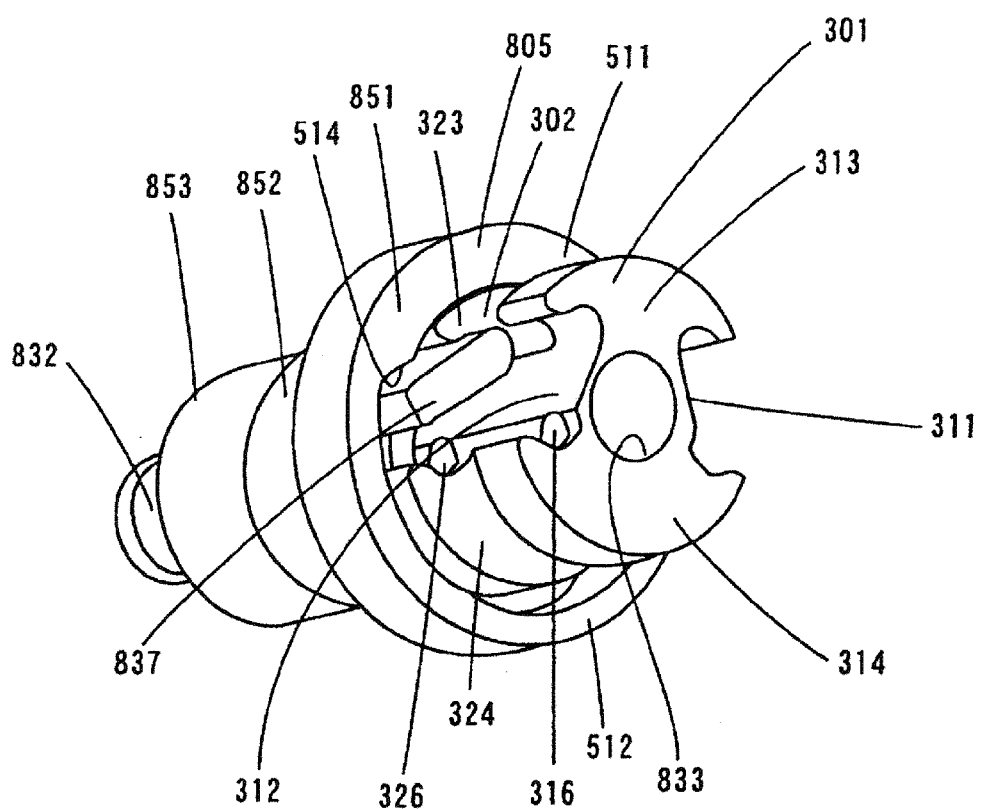
FIG. 16 is a perspective view showing a second rotating member and a third rotating member.

FIG. 8 is a cross-sectional view of the portion of shift mechanism 701 indicated by line A-A in FIG. 6, FIG. 9 is a cross-sectional view of the portion of shift mechanism 701 indicated by line B-B in FIG. 6, FIG. 10 is a cross-sectional view of the portion of shift mechanism 701 indicated by line C-C in FIG. 6, and FIG. 11 is a cross-sectional view of the portion of shift mechanism 701 indicated by line D-D in FIG. 6. FIG. 12 is a perspective view showing first rotating member 801 and regulating member 804, and FIG. 13 and FIG. 14 are perspective views showing second rotating member 803, regulating member 804, third rotating member 805, accommodating member 806, first transferring member 807, combination spring 100, and second transferring member 809. FIG. 15 is a perspective view showing second rotating member 803 and regulating member 804, and FIG. 16 is a perspective view showing second rotating member 803 and third rotating member 805.

As shown in FIG. 8, chamfering surface 131 is provided at the apex of each of projecting sections 813. Chamfering surface 131 is defined by a predetermined circumferential surface centered on the axial center of first rotating member 801. In this preferred embodiment, in the YZ plane, chamfering surfaces 131 and groove sections 145 are placed on approximately the same radius centered on positioning shaft 802, and first rotating member 801 and shift cam 14 are coupled.

Also, ball 795 and ball 796 are placed in the YZ plane so that the direction of the center point of ball 795 with respect to positioning shaft 802, and the direction of the center point of ball 796 with respect to positioning shaft 802, are identical.

As shown in FIG. 8 and FIG. 12, inner peripheral surface 817 of cylindrical section 812 has a concavo-convex shape. To be specific, concave surfaces 818 with an approximately V-shaped cross-section are provided in inner peripheral surface 817 at, for example, 30° intervals around the axial center of cylindrical section 812.

As shown in FIG. 8, FIG. 13, and FIG. 14, concave section 311 and concave section 312 are provided in first ratchet 301 (see FIG. 8) so as to curve inward. First fan-shaped section 313 is provided on the upper portion of first ratchet 301, and second fan-shaped section 314 is provided on the lower portion of first ratchet 301. First ratchet 301 is arranged so as to be symmetrical with respect to a plane through the center in the YZ plane of fan-shaped section 313 including the rotation axis of second rotating member 803, and have a uniform shape in the X direction.

As shown in FIG. 8, one end of lug plate 834 is fitted into a curving corner on the upper side of concave section 311. Lug plate 834 is provided so as to be able to pivot about one end. Also, one end of lug plate 835 is fitted into a curving corner on the upper side of concave section 312, and lug plate 835 is provided so as to be able to pivot about one end. In the following description, the other end of lug plate 834 denotes the front end of lug plate 834, and the other end of lug plate 835 denotes the front end of lug plate 835.

Hole 315 is provided in second fan-shaped section 314 on the concave section 311 side. Hole 315 is provided so as to extend from the center portion of the lower portion of second fan-shaped section 314 toward the lower corner of concave section 311. Also, hole 316 is provided in second fan-shaped section 314 on the concave section 312 side. Hole 316 is provided so as to extend from the center portion of the lower portion of second fan-shaped section 314 toward the lower corner of concave section 312.

Spring 317 is provided inside hole 315. One end of spring 317 is abutted against the lower surface of lug plate 834. In this preferred embodiment, spring 317 dimensions are set so that, in a standard state, the front end surface of lug plate 834 faces the lower inclined surface of concave surface 818 positioned in the +Y direction of positioning shaft 802 in a state in which it is brought close thereto.

Also, spring 318 is provided inside hole 316. One end of spring 318 is abutted against the lower surface of lug plate 835. In this preferred embodiment, the dimensions of spring 318 are set so that, in a standard state, the front end surface of lug plate 835 faces the lower inclined surface of concave surface 818 positioned in the −Y direction of positioning shaft 802 in a state in which it is brought close thereto.

As shown in FIG. 8, FIG. 12, and FIG. 13, the +X direction sides of lug plates 834 and 835 are accommodated inside cylindrical section 812. Also, as shown in FIG. 9 and FIG. 12 through FIG. 14, the −X direction sides of lug plates 834 and 835 are accommodated inside first concave section 401 of regulating member 804.

As shown in FIG. 9 and FIG. 10, first concave section 401 and second concave section 402 are arranged so as to be symmetrical with respect to a plane passing through the center in the YZ plane of fan-shaped section 313 in a standard state including the rotation axis of second rotating member 803, and have a uniform shape in the X direction.

As shown in FIG. 7 and FIG. 9, first concave section 401 includes guiding surface 411, auxiliary surface 412, partial cylindrical section 413, and latching surface 414 provided in order from above on the +Y direction side, together with guiding surface 415, auxiliary surface 416, partial cylindrical section 417, and latching surface 418 provided in order from above on the −Y direction side.

As shown in FIG. 9, guiding surface 411 is arranged so as to extend downward obliquely from the latch section 841 side. Guiding surface 411 curves gently so as to become convex in the outward direction of regulating member 804 in the YZ plane. Also, guiding surface 411 is provided farther inward (on the inner diameter) than inner peripheral surface 817 of cylindrical section 812 in the YZ plane.

Auxiliary surface 412 is arranged so as to become approximately coplanar with the upper inclined surface of concave surface 818 positioned to the side of positioning shaft 802 in a standard state. Partial cylindrical section 413 is arranged so as to be positioned on the circumference of a predetermined circle with the axial center of second rotating member 803 as its center. Partial cylindrical section 413 is provided farther outward (on the outer diameter) than inner peripheral surface 817.

Latching surface 414 is arranged so as to be parallel or approximately parallel to the upper inclined surface in concave surface 818 one down from concave surface 818 positioned to the side of positioning shaft 802 in a standard state. Also, the distance between latching surface 414 and the above-mentioned inclined surface is set so as to be equal or approximately equal to the thickness of lug plate 834. Latching surface 414 is arranged so as to extend as far as a position farther inward (on the inner diameter) than inner peripheral surface 817 of cylindrical section 812 in the YZ plane.

Guiding surface 415, auxiliary surface 416, partial cylindrical section 417, and latching surface 418 are preferably arranged in the same way, respectively, as guiding surface 411, auxiliary surface 412, partial cylindrical section 413, and latching surface 414.

As shown in FIG. 10 and FIG. 12, second concave section 402 includes upper surface 421, partial cylindrical section 422, trigger surface 423, open surface 424, bottom surface 425, and latching surface 426 provided in order from above on the +Y direction side, together with upper surface 431, partial cylindrical section 432, trigger surface 433, open surface 434, bottom surface 435, and latching surface 436 provided in order from above on the −Y direction side.

As shown in FIG. 10, upper surface 421 is arranged so as to extend in the +Y direction from the side of latch section 841. Partial cylindrical section 422 is arranged so as to be positioned on the circumference of a predetermined circle with the axial center of second rotating member 803 as its center.

Trigger surface 423 is arranged so as to extend downward obliquely in an approximately horizontal direction of positioning shaft 802. Open surface 424 is arranged so as to extend in an approximately vertical direction farther than partial cylindrical section 422 on the positioning shaft 802 side. Bottom surface 425 is arranged so as to incline gently. Latching surface 426 is arranged so as to extend upward obliquely.

Upper surface 431, partial cylindrical section 432, trigger surface 433, open surface 434, bottom surface 435, and latching surface 436 are arranged in the same way, respectively, as upper surface 421, partial cylindrical section 422, trigger surface 423, open surface 424, bottom surface 425, and latching surface 426.

As shown in FIG. 7 and FIG. 11, first cylindrical section 851 includes partial cylindrical section 511 and partial cylindrical section 512. Inclined surfaces 513 and 514 are provided on first cylindrical section 851 so as to connect the inner peripheral surface of partial cylindrical section 511 and the inner peripheral surface of partial cylindrical section 512.

As shown in FIG. 11, the inner peripheral surface of partial cylindrical section 511 is provided on the circumference of a predetermined circle with the axial center of second rotating member 803 as its center (hereinafter referred to as "first circle"). Also, the inner peripheral surface of partial cylindrical section 512 is provided on the circumference of a predetermined circle with the axial center of second rotating member 803 as its center and of greater diameter than the first circle (hereinafter referred to as "second circle").

The radius of the above-described first circle is smaller than the distance between corner 211 defined by trigger surface 423 and open surface 424 and the axial center of second rotating member 803, and is also smaller than the distance between corner 212 defined by trigger surface 433 and open surface 434 and the axial center of second rotating member 803.

The radius of the above-described second circle is greater than the distance between corner 221 defined by open surface 424 and bottom surface 425 and the axial center of second rotating member 803, and is also greater than the distance between corner 241 defined by open surface 434 and bottom surface 435 and the axial center of second rotating member 803.

Also, in third rotating member 805, partial cylindrical section 511 and partial cylindrical section 512 are arranged so that inclined surfaces 513 and 514 are positioned higher than trigger surfaces 423 and 433 in a standard state.

As shown in FIG. 11 and FIG. 15, concave section 321 and concave section 322 are arranged in second ratchet 302 so as to curve inward. Also, first fan-shaped section 323 is provided on the upper portion of second ratchet 302, and second fan-shaped section 324 is provided on the lower portion of second ratchet 302. Second ratchet 302 is arranged so as to be symmetrical with respect to a plane through the center in the YZ plane of fan-shaped section 323 including the rotation axis of second rotating member 803, and have a uniform shape in the X direction.

As shown in FIG. 11, one end of lug plate 836 is fitted into a curving corner on the upper side of concave section 321. And lug plate 836 is provided so as to be able to pivot about one end. Also, one end of lug plate 837 is fitted into a curving corner on the upper side of concave section 322, and lug plate 837 is provided so as to be able to pivot about one end. In the following description, the other end of lug plate 836 denotes the front end of lug plate 836, and the other end of lug plate 837 denotes the front end of lug plate 837.

Hole 325 is provided in second fan-shaped section 324 on the concave section 321 side. Hole 325 is provided so as to extend from the center portion of the lower portion of second fan-shaped section 324 toward the lower corner of concave section 321. Also, hole 326 is provided in second fan-shaped section 324 on the concave section 322 side. Hole 326 is provided so as to extend from the center portion of the lower portion of second fan-shaped section 324 toward the lower corner of concave section 322.

Spring 327 is provided inside hole 325. One end of spring 327 is abutted against the lower surface of lug plate 836. In this preferred embodiment, the dimensions of spring 327 are set so that, in a standard state, the front end surface of lug plate 836 faces trigger surface 423 in a state in which it is brought close thereto.

Also, spring 328 is provided inside hole 326. One end of spring 328 is abutted against the lower surface of lug plate 837. In this preferred embodiment, the dimensions of spring 328 are set so that, in a standard state, the front end surface of lug plate 837 faces trigger surface 433 in a state in which it is brought close thereto.

As shown in FIG. 10 and FIG. 15, the +X direction sides of lug plates 836 and 837 are accommodated inside second concave section 402 of regulating member 804. Also, as shown in FIG. 11 and FIG. 16, the −X direction sides of lug plates 836 and 837 are accommodated inside first cylindrical section 851 in third rotating member 805.

The operation of shift mechanism 701 when gear shifting is performed will now be described in detail with reference to the accompanying drawings. A case will be described below in which the shift-up button (not shown) is depressed by the rider.

Figure 17:
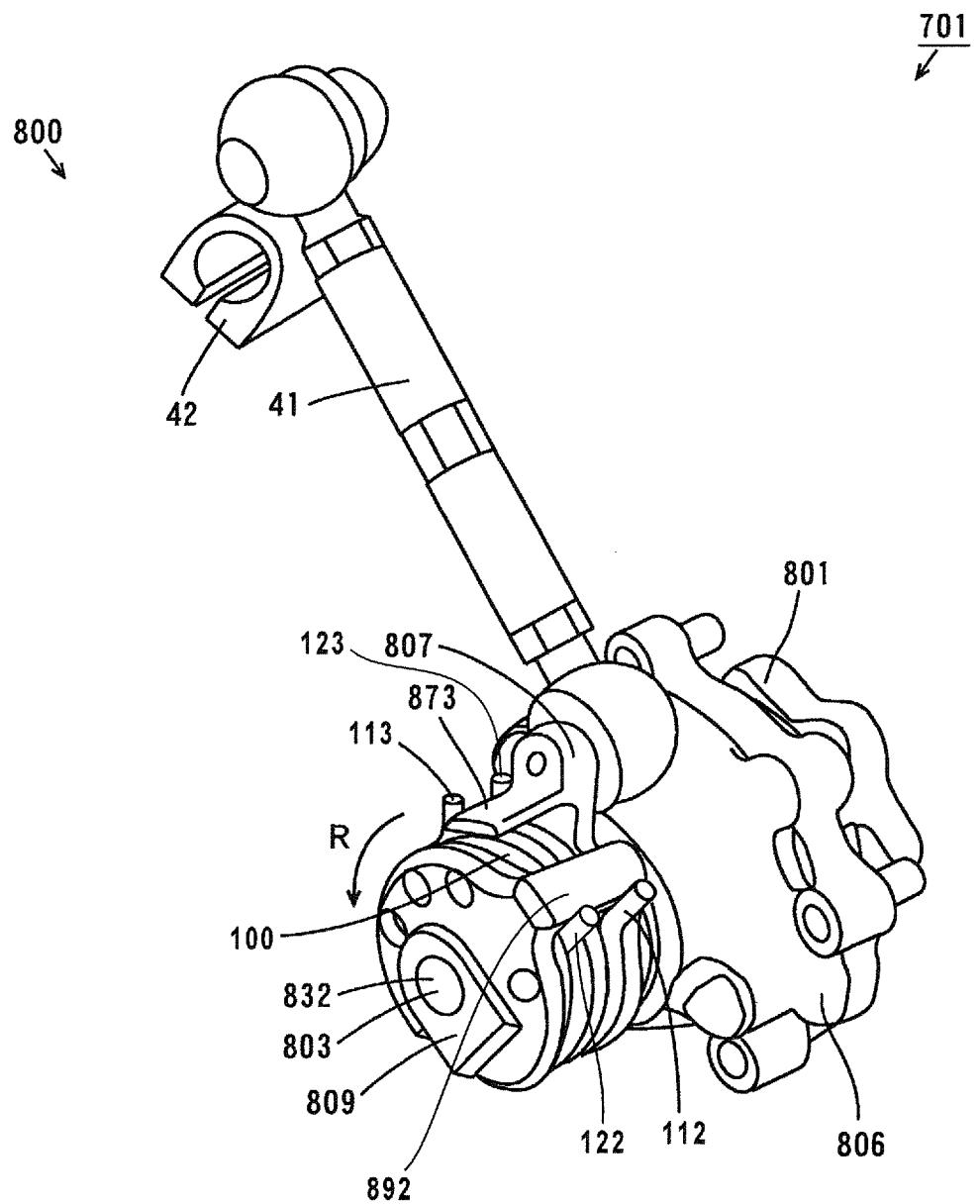
FIG. 17 is a drawing for explaining the operation of the shift mechanism.
Figure 17:
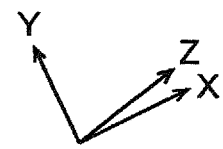
Figure 18:
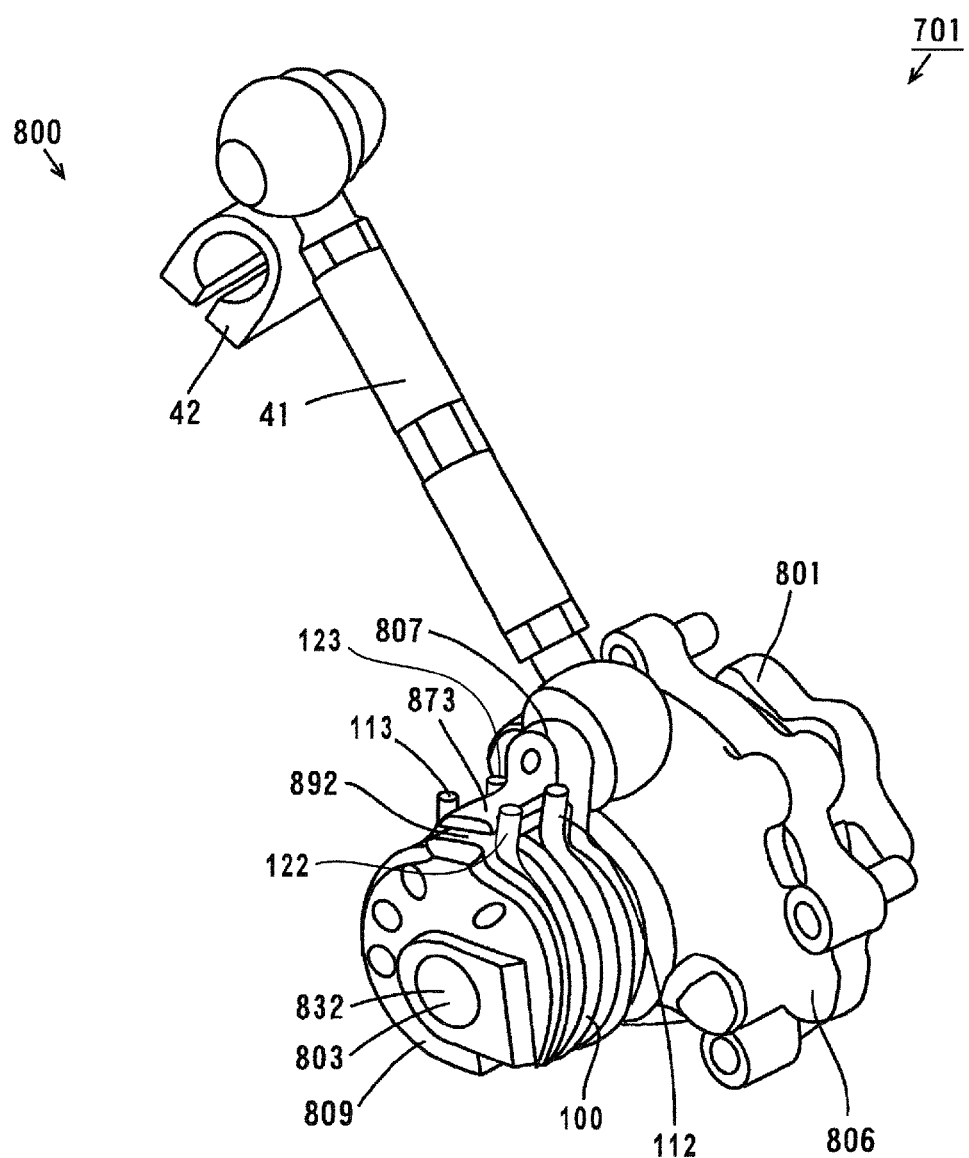
FIG. 18 is a drawing for explaining the operation of the shift mechanism.

FIG. 17 through FIG. 26 are drawings for explaining the operation of shift mechanism 701 when gear shifting is performed. FIG. 17 and FIG. 18 are perspective views of shift cam drive unit 800. The respective drawings A through D in FIG. 19 through FIG. 26 are cross-sectional views of the portions of shift mechanism 701 indicated by line A-A, line B-B, line C-C, and line D-D in FIG. 6, respectively. For example, each drawing A in FIG. 19 through FIG. 26 is a cross-sectional view of the portion of shift mechanism 701 indicated by line A-A in FIG. 6, and each drawing B in FIG. 19 through FIG. 26 is a cross-sectional view of the portion of shift mechanism 701 indicated by line B-B in FIG. 6. Similarly, each drawing C in FIG. 19 through FIG. 26 is a cross-sectional view of the portion of shift mechanism 701 indicated by line C-C in FIG. 6, and each drawing D in FIG. 19 through FIG. 26 is a cross-sectional view of the portion of shift mechanism 701 indicated by line D-D in FIG. 6. FIG. 19A through D show cross-sections of the respective portions in a standard state (corresponding to the cross-sectional views in FIG. 8 through FIG. 11). In FIG. 6 and FIG. 19, shift cam 14 has its rotation constrained through ball 795 being biased toward shift cam 14 in groove section 145 by spring 791 via moving member 793. The torque that constrains the rotation of shift cam 14 due to ball 795 will be described in detail below.

When the rider depresses the shift-up button, motor (see FIG. 2) is controlled by an ECU (not shown), and the rotating shaft (not shown) of motor 8 rotates through a predetermined angle (for example, in this preferred embodiment, approximately 40°). As shown in FIG. 4 through FIG. 6 and FIG. 17, swing arm 42 is connected to the rotating shaft of motor 8, and through the rotation of the rotating shaft of motor 8, swing arm 42 is rotated and drive mechanism 41 is moved in approximately the Y-axial direction. Thus, as shown in FIG. 17, first transferring member 807 is rotated in the direction indicated by arrow R by drive mechanism 41. In the following description, rotation in the arrow R direction denotes counterclockwise rotation, and rotation in the opposite direction denotes clockwise rotation. Rotation in one of these clockwise and counterclockwise directions corresponds to rotation in the forward direction and rotation in the other direction corresponds to rotation in the reverse direction.

Through the counterclockwise rotation of first transferring member 807, the second hook set (hook sections 113 and 123) of combination spring 100 is pressed in the counterclockwise direction by latch section 873. As a result, counterclockwise torque (reaction force) is generated in the first hook set (hook sections 112 and 122) of combination spring 100.

The torque (reaction force) generated in combination spring 100 is imparted to latch section 892 via second hook set 113 and 123. Thus, counterclockwise torque is imparted to second transferring member 809. As described above, shaft section 832 of second rotating member 803 is fixed to second transferring member 809. Therefore, torque imparted to second transferring member 809 is imparted to second rotating member 803.

As shown in FIG. 19C and FIG. 19D, in a standard state, the front end surface of lug plate 836 faces trigger surface 423 of regulating member 804 in a state in which it is brought close thereto. In this case, even though second rotating member 803 rotates due to torque imparted by combination spring 100 (see FIG. 17), the front end surface of lug plate 836 abuts trigger surface 423 immediately after the start of that rotation operation. Thus, movement of lug plate 836 is stopped, and rotation of second rotating member 803 is stopped.

Therefore, immediately after the start of a rotation operation of motor 8 (FIG. 6), third rotating member 805 alone rotates while second rotating member 803 is stopped, as shown in FIG. 19D and FIG. 20D. As a result, as shown in FIG. 17, latch section 873 and latch section 892 are distanced from each other, and counterclockwise torque is accumulated in combination spring 100.

As shown in FIG. 20D, when third rotating member 805 rotates, inclined surface 513 of third rotating member 805 moves so as to intersect trigger surface 423 of regulating member 804. At this time, inclined surface 513 presses against lug plate 836. As a result, lug plate 836 presses against spring 327 and moves over inclined surface 513 so as to be folded in the inward direction of third rotating member 805.

Figure 21A:
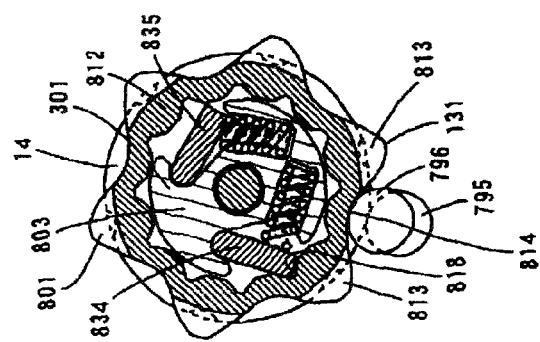
FIG. 21A is a drawing for explaining the operation of the shift mechanism.

When third rotating member 805 rotates through a predetermined angle (for example, approximately 32.5°) from a standard state, lug plate 836 is fully pushed out from the top of trigger surface 423 by inclined surface 513. Thus, the torque accumulated in combination spring 100 is biased, and regulation of the rotation of second transferring member 809 and second rotating member 803 for which counterclockwise rotation (the same as first transferring member 807 and third rotating member 805) had been regulated is released. As a result, as shown in FIG. 21C and FIG. 21D, second rotating member 803 rotates counterclockwise while moving the front end surface of lug plate 836 toward bottom surface 425 along open surface 424.

As shown in FIG. 19A, in a standard state, the front end surface of lug plate 834 faces the lower inclined surface in predetermined concave surface 818 in first rotating member 801 in a state in which it is brought close to that inclined surface. Consequently, as shown in FIG. 21A and FIG. 21B, concave surface 818 is pressed by the front end surface of lug plate 834 through the counterclockwise rotation of second rotating member 803, and first rotating member 801 rotates counterclockwise.

Also, shift cam 14 rotates due to the rotation of first rotating member 801. Torque biased in a counterclockwise direction on the first rotating member 801 and shift cam 14 from combination spring 100 via second transferring member 809, second rotating member 803, and lug plate 834 at this time is set larger than the torque such that ball 795 constrains the rotation of shift cam 14 in the standard state.

Thus, one of shift forks 141 through 144 (see FIGS. 4 and 5) moves. As a result, as explained with reference to FIG. 15, FIG. 17, and FIG. 18, a transmission gear in the odd-numbered gear group set to a neutral position or a transmission gear of the even-numbered gear group set to a neutral position is coupled.

Figure 21B:
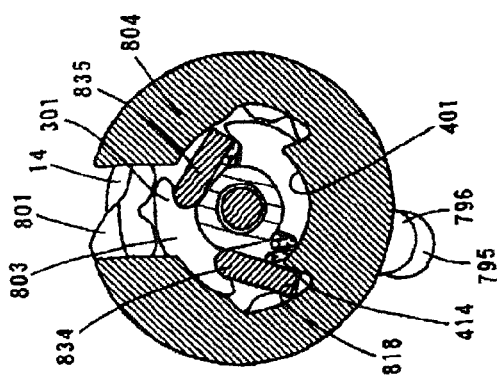
FIG. 21B is a drawing for explaining the operation of the shift mechanism.
Figure 21C:
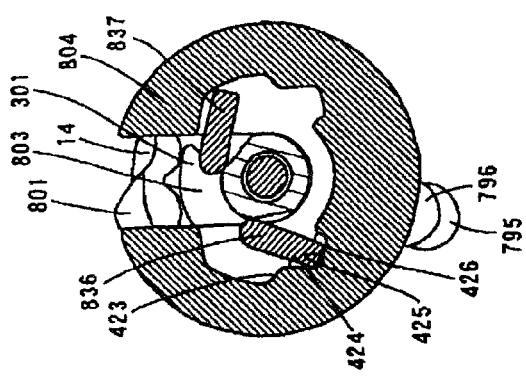
FIG. 21C is a drawing for explaining the operation of the shift mechanism.
Figure 21D:
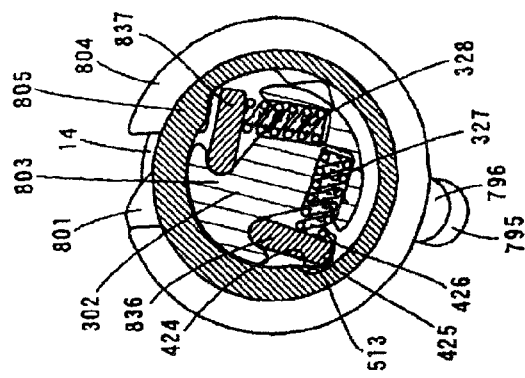
FIG. 21D is a drawing for explaining the operation of the shift mechanism.
Figure 22A:
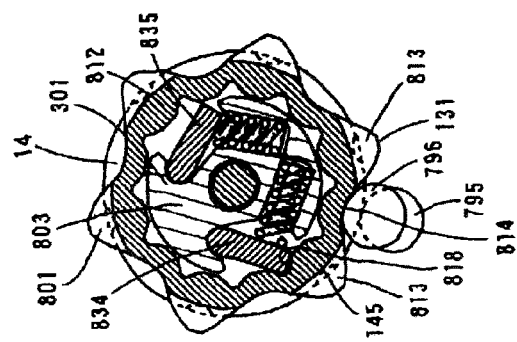
FIG. 22A is a drawing for explaining the operation of the shift mechanism.
Figure 22B:
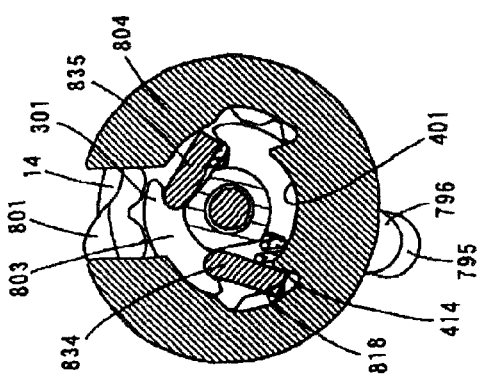
FIG. 22B is a drawing for explaining the operation of the shift mechanism.
Figure 22C:
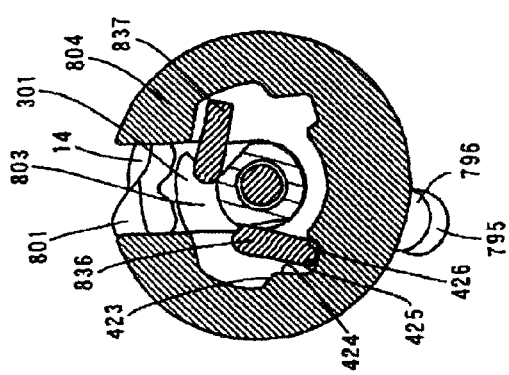
FIG. 22C is a drawing for explaining the operation of the shift mechanism.
Figure 22D:
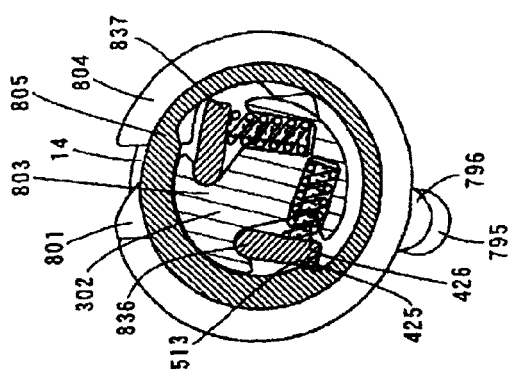
FIG. 22D is a drawing for explaining the operation of the shift mechanism.
Figure 23A:
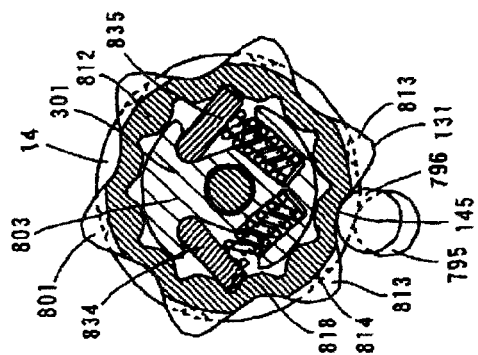
FIG. 23A is a drawing for explaining the operation of the shift mechanism.
Figure 23B:
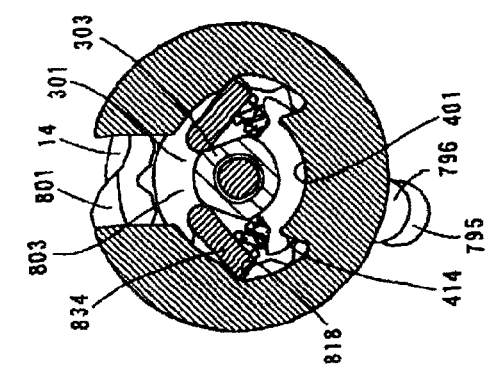
FIG. 23B is a drawing for explaining the operation of the shift mechanism.
Figure 23C:
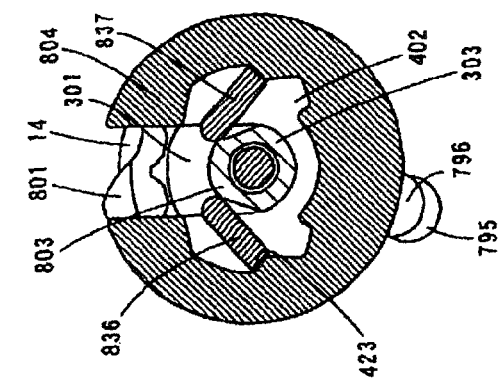
FIG. 23C is a drawing for explaining the operation of the shift mechanism.
Figure 23D:
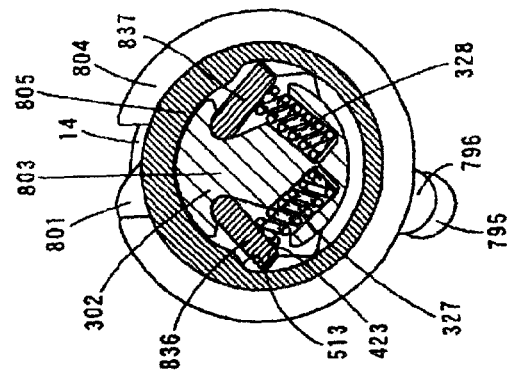
FIG. 23D is a drawing for explaining the operation of the shift mechanism.
Figure 23D:
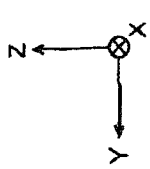
Figure 26A:
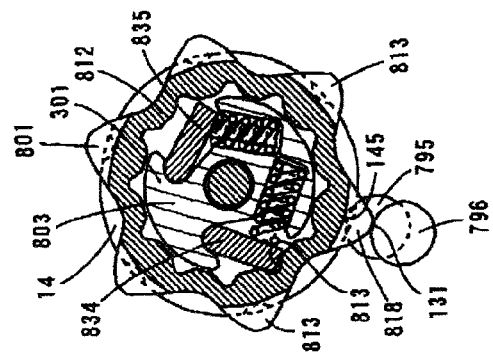
FIG. 26A is a drawing for explaining the operation of the shift mechanism.
Figure 26B:
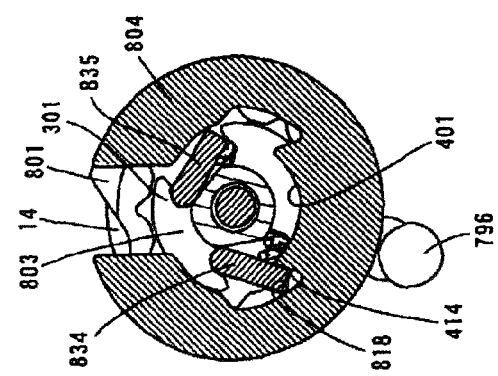
FIG. 26B is a drawing for explaining the operation of the shift mechanism.
Figure 26C:
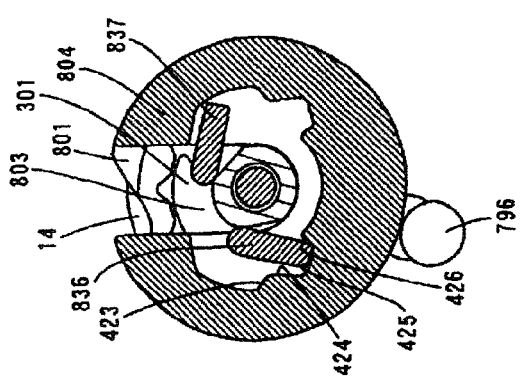
FIG. 26C is a drawing for explaining the operation of the shift mechanism.
Figure 26D:
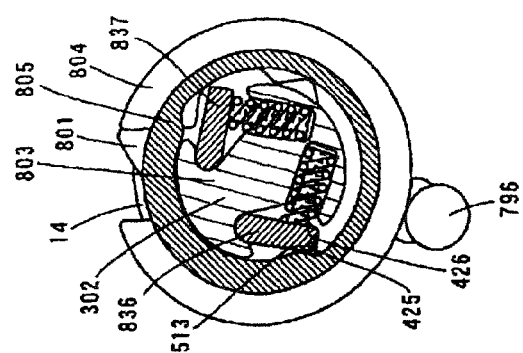
FIG. 26D is a drawing for explaining the operation of the shift mechanism.

As shown in FIG. 21B, lug plate 834 abuts latching surface 414 when second rotating member 803 rotates counterclockwise through approximately 30°. Thus, the rotation angle of second rotating member 803 is limited to approximately 30°, for example. Also, as shown in FIG. 22D, lug plate 836 abuts latching surface 426 when third rotating member 805 rotates counterclockwise through approximately 45°. Thus, the rotation angle of third rotating member 805 is limited to approximately 45°, for example.

Thus, in this preferred embodiment, the possible rotation angle of third rotating member 805 is set larger than the possible rotation angle of second rotating member 803. In this case, the rotating shaft of motor 8 can be rotated so that the rotation angle of third rotating member 805 becomes 30° or more, for example, facilitating control of motor 8 (see FIG. 6) by the ECU. Thus, it is possible to ensure that an inadequate rotation amount of third rotating member 805 is prevented. As a result, second rotating member 803 can be rotated dependably, and shift cam 14 can be rotated dependably.

Following this, motor 8 is again controlled by the ECU, and the rotating shaft of motor 8 rotates through a predetermined angle (in this preferred embodiment, approximately 40°). In other words, the rotating shaft is restored to its original position. Thus, first transferring member 807 and third rotating member 805 rotate clockwise through approximately 45°, for example. As a result, third rotating member 805 returns to its original position (the same position as in the standard state) as shown in FIG. 23.

Also, latch section 892 of second transferring member 809 has its rotation constrained by latch section 873 of first transferring member 807 and the first hook set (hook sections 112 and 122) and the second hook set (hook sections 113 and 123) of combination spring 100, and rotates clockwise together with first transferring member 807. Torque that constrains the relative rotation of latch section 892 and latch section 873 by combination spring 100 at this time is set larger than a torque regulating the relative rotation of second rotating member 803 and first rotating member 801 through lug plate 834 pressing against inner peripheral surface 817 due to the extension of spring 317 when second rotating member 803 moves from the position in FIG. 22 to the position in FIG. 23. As a result, second rotating member 803 returns to its original position (the same position as in the standard state) together with third rotating member 805.

When second rotating member 803 moves from the position in FIG. 22 to the position in FIG. 23, first rotating member 801 has its rotation constrained by ball 796 being biased toward first rotating member 801 by spring 792 via moving member 794 in concave section 814 of the outer peripheral surface of first rotating member 801. Torque that constrains the rotation of first rotating member 801 by ball 796 at this time is set larger than torque regulating the relative rotation of second rotating member 803 and the first rotating member through lug plate 834 pressing against inner peripheral surface 817 due to the extension of spring 317. The torque in which ball 796 constrains the rotation of first rotating member 801 will be described in detail below.

Thus, when second rotating member 803 moves from the position in FIG. 22 to the position in FIG. 23, lug plate 834 moves along inner peripheral surface 817 while extending spring 317. Therefore, when second rotating member 803 moves from the position in FIG. 22 to the position in FIG. 23, rotation of first rotating member 801 via lug plate 834 is stopped.

Also, when second rotating member 803 moves from the position in FIG. 22 to the position in FIG. 23, the front end of lug plate 835 moves along guiding surface 415 and auxiliary surface 416. Here, guiding surface 415 is provided farther inward than inner peripheral surface 817 of cylindrical section 812 in the YZ plane. Also, auxiliary surface 416 is arranged so as to be approximately coplanar with the upper inclined surface of concave surface 818. Therefore, when second rotating member 803 moves from the position in FIG. 22 to the position in FIG. 23, rotation of first rotating member 801 via lug plate 835 is stopped.

As a result of the above, as shown in FIG. 22 and FIG. 23, it is possible for second rotating member 803 alone to be rotated while first rotating member 801 and shift cam 14 are stopped.

Following this, motor 8 (see FIG. 6) is again controlled by the ECU, and, as shown in FIG. 23 through FIG. 26, first rotating member 801 and shift cam 14 rotate counterclockwise through approximately 30° in the same way as in FIG. 19 through FIG. 22. Thus, one of shift forks 141 through 144 (see FIG. 2) moves. As a result, as explained with reference to FIG. 15, FIG. 20, and FIG. 21, either the odd-numbered gear group or the even-numbered gear group is set to a neutral position.

Following this, motor 8 (see FIG. 2) is again controlled by the ECU, and third rotating member 805 rotates clockwise through approximately 45°. Thus, as explained with reference to FIG. 22 and FIG. 23, second rotating member 803 is returned to its position in the standard state (the state in FIG. 19) while shift cam 14 and first rotating member 801 are stopped. As a result, a gear shift in transmission mechanism 700 ends.

When transmission mechanism 700 is shifted down, second rotating member 803 is rotated in the opposite direction to the rotation direction described with reference to FIG. 19 through FIG. 26.

Torque imparted to shift cam 14 will now be described.

Figure 27:
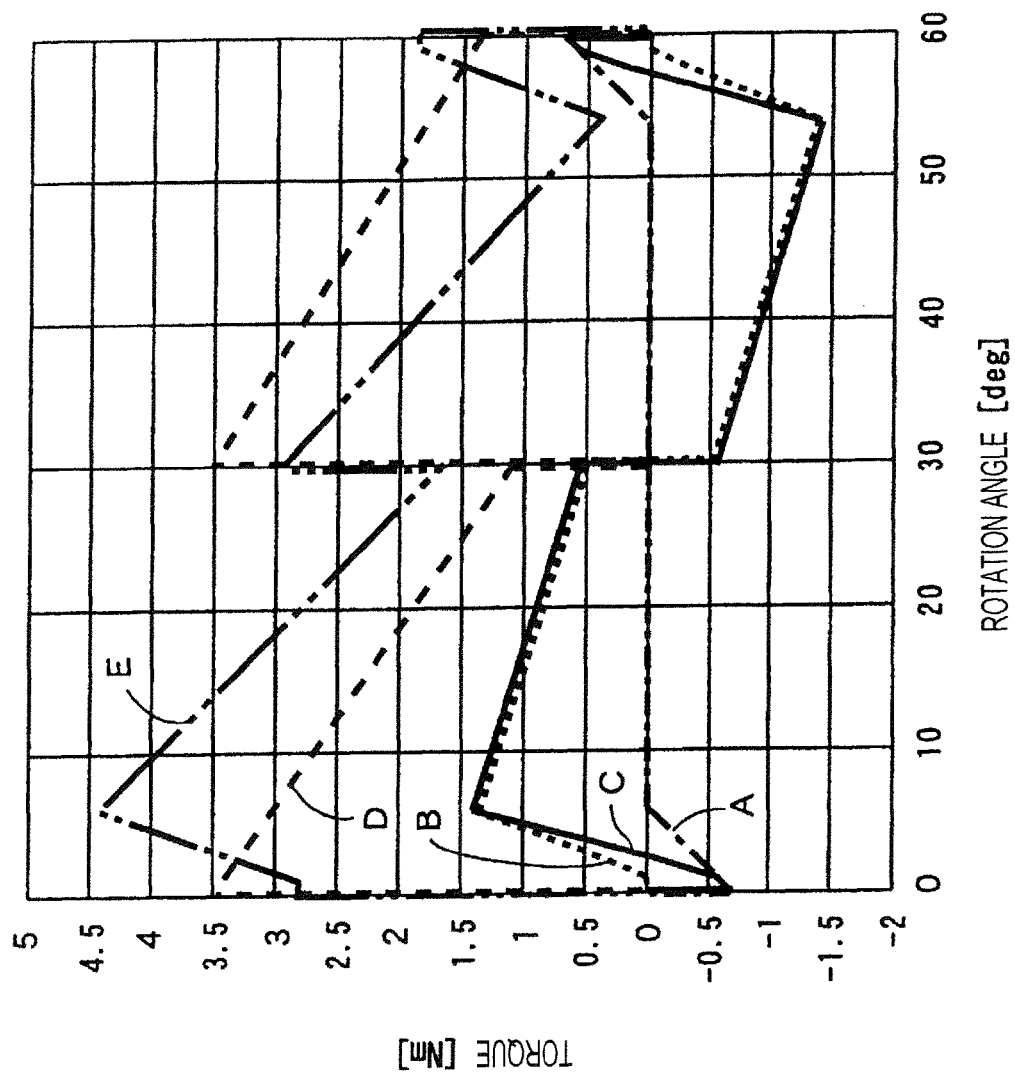
FIG. 27 is a drawing showing torque imparted to a shift cam and a first rotating member.

FIG. 27 is a drawing showing torque imparted to shift cam 14 and first rotating member 801 when shift cam 14 rotates through 60° from one standard state to the next standard state.

The vertical axis in FIG. 27 indicates torque [Nm] imparted to shift cam 14 and first rotating member 801, and the horizontal axis indicates the rotation angle [deg] from a standard state of shift cam 14 and first rotating member 801. Therefore, rotation angles 0° and 60° in FIG. 27 indicate standard states of shift cam 14 and first rotating member 801. In FIG. 27, torque in a counterclockwise direction is shown as a positive value, and torque in a clockwise direction is shown as a negative value.

In FIG. 27, dash-dot line A indicates torque imparted to shift cam 14 from spring 791 (see FIG. 6) via ball 795 (see FIG. 6), and dotted line B indicates torque imparted to first rotating member 801 from spring 792 (see FIG. 6) via ball 796 (see FIG. 6). Also, in FIG. 27, solid line C indicates composite torque including the torque indicated by dash-dot line A and the torque indicated by dotted line B, dashed line D indicates torque imparted to shift cam 14 and first rotating member 801 from combination spring 100, and dash-dot-dot line E indicates composite torque including the torque indicated by solid line C and the torque indicated by dashed line D. Therefore, the actual torque imparted to shift cam 14 is the value indicated by dash-dot-dot line E.

In the standard state shown in FIG. 8, ball 795 is stopped in the center of groove section 145. In this case, the direction of force imparted to shift cam 14 from spring 791 (see FIG. 6) via ball 795 coincides with the radial direction of shift cam 14. Consequently, torque is not imparted to shift cam 14 from ball 795.

Also, in the standard state, ball 796 is positioned on chamfering surface 131 of projecting section 813. In this case, the direction of force imparted to first rotating member 801 from spring 792 (see FIG. 6) via ball 796 coincides with the radial direction of first rotating member 801. Consequently, torque is not imparted to first rotating member 801 from ball 796.

First, torque imparted to shift cam 14 from spring 791 will be described.

When shift cam 14 rotates counterclockwise from a standard state, ball 795 is pushed out from groove section 145. At this time, the point of contact between ball 795 and shift cam 14 moves along the left corner edge of that groove section 145 in FIG. 8. At this time, a moment acts upon shift cam 14 due to a normal force at the point of contact between ball 795 and shift cam 14 receiving pressure from spring 791. That is, negative torque is imparted to shift cam 14 from spring 791 as indicated by dash-dot line A in FIG. 27.

Negative torque imparted to shift cam 14 from spring 791 reaches a maximum immediately after the start of a shift cam 14 rotation operation. Thereafter, the negative torque imparted to shift cam 14 from spring 791 decreases as the rotation angle of shift cam 14 increases.

Ball 795 (see FIG. 8) is pushed completely out of groove section 145 when shift cam 14 has rotated through approximately 6° from the standard state (immediately before portions of a transmission gear and spline gear that fit together and are coupled through a dog mechanism come into contact). When the point of contact between ball 795 and shift cam 14 is not positioned inside groove section 145, the direction of force imparted to shift cam 14 from spring 791 via ball 795 coincides with the radial direction of shift cam 14. Consequently, torque imparted to shift cam 14 from spring 791 at this time is 0, as indicated by dash-dot line A in FIG. 27.

In this preferred embodiment, groove section 145 is arranged in such a way that ball 795 is pushed completely out of groove section 145 by the rotation of shift cam 14 through approximately ±6° or more from a standard state. Therefore, as indicated by dash-dot line A in FIG. 27, when the rotation angle from a standard state (hereinafter abbreviated simply to "rotation angle") of shift cam 14 is within a range of approximately 6° to approximately 54°, torque imparted to shift cam 14 from spring 791 is 0.

As shown in FIG. 25A, when the rotation angle of shift cam 14 exceeds 54°, the point of contact between ball 795 and shift cam 14 moves into groove section 145 again. At this time, the point of contact between ball 795 and shift cam 14 moves along the right corner edge of groove section 145 shown in FIG. 25A. At this time, a moment acts upon shift cam 14 due to a normal force at the point of contact between ball 795 and shift cam 14 receiving pressure from spring 791—that is, positive torque is imparted to shift cam 14 from spring 791 as indicated by dash-dot line A in FIG. 27.

As indicated by dash-dot line A in FIG. 27, positive torque imparted to shift cam 14 from spring 791 increases as the rotation angle of shift cam 14 increases until the rotation angle of shift cam 14 reaches 60°—that is, until ball 795 is stopped in the center of adjacent groove section 145 to groove section 145 that has been engaged earlier.

When the rotation angle of shift cam 14 reaches 60°, ball 795 comes into contact with shift cam 14 at the left and right corner edges of groove section 145. At this time, moments in both circumferential directions acting upon shift cam 14 through a normal force at the left and right points of contact are in balance. That is, through the pressure provided by spring 791, shift cam 14 is held in a stable state in which there is holding torque in both directions.

Next, torque imparted to first rotating member 801 from spring 792 (FIG. 6) will be described.

Immediately after first rotating member 801 starts counterclockwise rotation, the point of contact between ball 796 and first rotating member 801 is positioned on chamfering surface 131 (see FIG. 8). In this case, the direction of force imparted to first rotating member 801 from spring 792 via ball 796 coincides with the radial direction of first rotating member 801. Consequently, torque is not imparted to first rotating member 801 from spring 792. That is, torque imparted to 801 from spring 792 is maintained at 0 as indicated by dotted line B in FIG. 27.

In FIG. 8, the point of contact between ball 796 and first rotating member 801 moves along the left corner edge of projecting section 813 from chamfering surface 131 due to further rotation of first rotating member 801 in a counterclockwise direction. At this time, a moment acts upon first rotating member 801 due to a normal force at the point of contact between ball 796 and first rotating member 801 receiving pressure from spring 792. That is, positive torque is imparted to first rotating member 801 from spring 792 as indicated by dotted line B in FIG. 27.

The positive torque imparted to first rotating member 801 from spring 792 indicated by dotted line B reaches a maximum when first rotating member 801 has rotated through approximately 6° from the standard state (immediately before portions of a transmission gear and spline gear that fit together and are coupled through a dog mechanism come into contact), and gradually decreases thereafter. The variability characteristic of torque imparted to first rotating member 801 from spring 792 and the rotation angle of first rotating member 801 at which the torque reaches a maximum are decided by the shape of projecting section 813.

As shown in FIG. 21A, when first rotating member 801 rotates through approximately 30° from a standard state, ball 796 and first rotating member 801 come into contact with both sides of an undulating inclined surface reaching projecting sections 813 on the left and right of concave section 814 sandwiching the center of that concave section 814. At this time, moments in both directions acting upon first rotating member 801 through a normal force at the left and right points of contact are in balance. Consequently, through pressure from spring 792, first rotating member 801 is held in a stable state in which there is holding torque in both directions circumferentially, as indicated by dotted line B in FIG. 27.

Through further counterclockwise rotation of first rotating member 801 from the position shown in FIG. 21A, the point of contact between ball 796 and first rotating member 801 moves to an undulating surface on the left side of concave section 814 shown by FIG. 21A. At this time, a moment acts upon first rotating member 801 due to a normal force at the point of contact between ball 796 and first rotating member 801 receiving pressure from spring 792. That is, negative torque is imparted to first rotating member 801 from spring 792 as indicated by dotted line B in FIG. 27.

When first rotating member 801 has rotated through approximately 54° from the standard state, the negative torque imparted to first rotating member 801 from spring 792 indicated by dotted line B reaches a negative maximum. Thereafter, the torque imparted to first rotating member 801 from spring 792 becomes 0 when the point of contact between ball 796 and first rotating member 801 moves to a position on chamfering surface 131 (see FIG. 25A).

As indicated by dotted line C in FIG. 27, composite torque of torque imparted to shift cam 14 from spring 791 and torque imparted to first rotating member 801 from spring 792 is a negative value in the rotation angle range for shift cam 14 from 0° to approximately 2.5°, a positive value in the rotation angle range for shift cam 14 from approximately 2.5° to 30°, a negative value in the rotation angle range for shift cam 14 from 30° to approximately 57.5°, and a negative value in the rotation angle range for shift cam 14 from approximately 57.5° to 60°. Also, at the phases at which the rotation angle of shift cam 14 is 0°, 30°, and 60°, shift cam 14 is held in a stable state in which there is holding torque in both rotation directions. Thus, it is possible to stabilize gears in the transmission. As a result, a vehicle is able to drive smoothly.

As explained with reference to FIG. 19 through FIG. 26, in this preferred embodiment torque accumulated in combination spring 100 (corresponding to a predetermined reaction force) is imparted to first rotating member 801 and shift cam 14 each time third rotating member 805 rotates through approximately 30° from a standard state, for example. Thus, first rotating member 801 and shift cam 14 rotate through 30°, for example.

Therefore, as indicated by dashed line D in FIG. 27, torque imparted to first rotating member 801 and shift cam 14 from combination spring 100 reaches a maximum at first rotating member 801 and the rotation angle of shift cam 14 is preferably 0° and 30°, for example.

In shift mechanism 701 according to this preferred embodiment, torque combining torque imparted to shift cam 14 from springs 791 and 792 (solid line C in FIG. 27) and torque imparted to shift cam 14 from combination spring 100 (dashed line D in FIG. 27) is imparted to shift cam 14. That is, the value indicated by dash-dot-dot line E in FIG. 27 is imparted to shift cam 14.

As explained above, composite torque of torque imparted to shift cam 14 from spring 791 and torque imparted to first rotating member 801 from spring 792 (the solid line C value) preferably has mostly a positive value in the rotation angle range for shift cam 14 from 0° to 30°, and mostly a negative value in the rotation angle range for shift cam 14 from 30° to 60°, for example. Therefore, as indicated by dash-dot-dot line E, torque imparted to shift cam 14 in the rotation angle range for shift cam 14 from 0° to 30° preferably is greater than torque imparted to shift cam 14 in the rotation angle range for shift cam 14 from 30° to 60°, for example.

Also, torque imparted to shift cam 14 reaches a maximum when the rotation angle of shift cam 14 is approximately 6° (immediately before portions of a transmission gear and spline gear that fit together and are coupled through a dog mechanism come into contact), for example.

In this preferred embodiment, a large torque is temporarily accumulated in combination spring 100, and shift cam 14 is rotated by releasing the accumulated torque. Therefore, a large torque can be imparted to shift cam 14 at the start of rotation of shift cam 14. As a result, a spline gear can be moved at high speed, enabling a spline gear and transmission gear to be reliably coupled and separated as soon as the transmission operation has started.

Also, it is desirable for the magnitude of torque imparted to shift cam 14 to be set appropriately according to the configuration of shift mechanism 701 and the like. The magnitude of torque imparted to shift cam 14 can be changed by changing the spring constants and/or attachment loads of spring 791, spring 792, and combination spring 100 as appropriate.

In this preferred embodiment, spring 791, spring 792, and combination spring 100 are provided so that torque in the opposite direction to the rotation direction of shift cam 14 in composite torque is not imparted to shift cam 14 when shift cam 14 is rotated.

In shift mechanism 701 configured in the above described manner, when combination spring 100 functions, stress concentrates at the respective bent sections between hook sections 112, 113, 122, and 123 and coil sections 111 and 121.

Since combination spring 100 is preferably defined by two torsion springs, namely, first torsion spring 110 and second torsion spring 120, in comparison to a configuration that uses a single torsion spring, a load applied to respective hook sections 112, 113, 122, and 123 is reduced by half.

Thus, stress applied to hook sections 112, 113, 122, and 123 in respective torsion springs 110 and 120 can be markedly reduced. In addition, the winding directions in which overlapping coil sections 111 and 121 are wound in a helical shape are different to each other. Consequently, even if rotational moments are generated in respective coil sections 111 and 121 by application of a load to hook sections 112, 113, 122, and 123 at both ends of coil sections 111 and 121, the rotational moments cancel each other out. As a result, an inclination does not arise in the winding center axis of the coil in respective coil sections 111 and 121. Hence, bias (a desired reaction force) around the rotation axis can be effectively obtained in the form of a torque that rotates shift cam 14, without requiring a member that regulates inclination of the torsion springs.

Although in the combination torsion spring according to this preferred embodiment a configuration preferably includes two torsion springs, namely, first torsion spring 110 and second torsion spring 120 having respective directions in which coil sections 111 and 121 are wound in a helical shape and which are different to each other, a configuration may also be adopted that combines three or more torsion springs.

The disclosure of the specification, the drawings, and the abstract included in Japanese Patent Application No. 2010-260614, filed on Nov. 22, 2010 are incorporated herein by reference in their entirety.

A combination torsion spring according to preferred embodiments of the present invention provides an advantageous effect in which a predetermined reaction force in a direction of a coil circumference can be suitably obtained without a winding center of a coil section inclining even under a load, and is suitable for use as a torsion spring included in a shift mechanism mounted on a motorcycle or other vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A combination torsion spring comprising:
   a first torsion spring and a second torsion spring each including a coil section and a first hook section and a second hook section provided at ends of the coil section; wherein
   the first torsion spring and the second torsion spring are arranged so that directions in which the coil sections are wound in a helical shape are different to each other, and an inner diameter of the coil section of the first torsion spring is approximately equal to an outer diameter of the coil section of the second torsion spring;
   the coil section of the second torsion spring is inserted into an inside of the coil section of the first torsion spring;
   a set of the first hook section of the first torsion spring and the first hook section of the second torsion spring and a set of the second hook section of the first torsion spring and the second hook section of the second torsion spring are positioned at positions that sandwich the coil sections;
   the first hook section of the first torsion spring and the first hook section of the second torsion spring are engaged with one of a pair of action members, the pair of action members mutually transmitting torque via the first torsion spring and the second torsion spring;
   the second hook section of the first torsion spring and the second hook section of the second torsion spring are engaged with another one of the pair of action members; and
   a change direction of a coiling diameter of the coil section of the first torsion spring by deflection of the first torsion spring is equal to a change direction of a coiling diameter of the coil section of the second torsion spring by deflection of the second torsion spring when one of the pair of action members is rotated relatively to the another one of the pair of action members, the change direction of the coiling diameter being the direction that the coiling diameter is expanded or reduced.

2. A shift mechanism that moves shift forks connected to a gear of a transmission, the shift mechanism comprising:
   a combination torsion spring according to claim 1;
   a shift cam including, on an outer periphery, cam grooves to which the shift forks can be connected, the shift cam arranged to rotate so as to move the shift forks by a certain rotation angle;
   a cam phase holding section that holds the shift cam at phases determined based on the certain rotation angle;
   a rotating section arranged to rotate in forward and reverse directions from a reference position, and to rotate the shift cam through the certain rotation angle;
   a transferring section that rotates in one of the forward and reverse directions from the reference rotation position due to rotation power of a motor, and transfers a torque to the rotating section via the combination torsion spring in which bias increases accompanying an increase in a rotation angle of the transferring section; and
   a rotation regulating section that, while the transferring section is rotating in the one of the forward and reverse directions, regulates the rotation of the rotating section until a predetermined rotation angle is reached and accumulates an increasing bias of the combination torsion spring, and when the rotation angle of the transferring section is at or beyond the predetermined rotation angle, allows the rotation of the rotating section and converts the bias of the combination torsion into a torque applied to the rotating section; wherein
   the rotating section rotates the shift cam that is held by the cam phase holding section using the torque that is provided by the combination torsion spring.

3. The combination torsion spring according to claim 1, wherein, when a set of the first hook section of the first torsion spring and the second hook section of the second torsion spring moves in a circumferential direction away from a set of the second hook section of the first torsion spring and the first hook section of the second torsion spring, bias is accumulated in the coil sections.

* * * * *